US012794395B2

(12) United States Patent
Gao et al.

(10) Patent No.: US 12,794,395 B2
(45) Date of Patent: Nov. 10, 2026

(54) POWER TOOL

(71) Applicant: Nanjing Chervon Industry Co., Ltd., Nanjing (CN)

(72) Inventors: Qing Gao, Nanjing (CN); Tengyue Li, Nanjing (CN); Pan Lin, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 215 days.

(21) Appl. No.: 18/661,903

(22) Filed: May 13, 2024

(65) Prior Publication Data

US 2024/0297608 A1 Sep. 5, 2024

Related U.S. Application Data

(63) Continuation-in-part of application No. PCT/CN2022/137389, filed on Dec. 8, 2022.

(30) Foreign Application Priority Data

Dec. 27, 2021 (CN) .......................... 202111611939.8
Dec. 27, 2021 (CN) .......................... 202111611940.0
(Continued)

(51) Int. Cl.
*H02P 29/028* (2016.01)
*H02P 6/12* (2006.01)
(Continued)

(52) U.S. Cl.
CPC .............. *H02P 29/028* (2013.01); *H02P 6/12* (2013.01); *H02P 6/15* (2016.02); *H02P 6/28* (2016.02); *H02P 29/032* (2016.02)

(58) Field of Classification Search
CPC .. H02P 29/028; H02P 6/12; H02P 6/15; H02P 6/28; H02P 29/032
See application file for complete search history.

(56) References Cited

U.S. PATENT DOCUMENTS 6,237,698 B1 * 5/2001 Carrier .................... B25F 5/008 173/171
6,874,235 B1 4/2005 Legrand
(Continued)

FOREIGN PATENT DOCUMENTS

CN 1128090 C 11/2003
CN 101821939 B 7/2013
(Continued)

OTHER PUBLICATIONS

Extended Search Report from international application No. 22914120.5, dated Jan. 13, 2025, 5 pp.
(Continued)

*Primary Examiner* — Thai T Dinh
(74) *Attorney, Agent, or Firm* — Greenberg Traurig, LLP

(57) ABSTRACT

A power tool includes an electric motor including a rotor and three-phase stator windings, where the stator windings have a certain electrical conduction angle when the electric motor operates; a driver circuit having multiple semiconductor switching elements; a parameter detection module for detecting a working parameter of the operating electric motor; and a controller electrically connected to at least the driver circuit and the electric motor. The controller is configured to acquire the working parameter; and according to the working parameter, correct the electrical conduction angle of the stator windings of the operating electric motor. A power tool that can accurately detect a commutation point and adjust the conduction angle of the electric motor windings accordingly is provided.

16 Claims, 17 Drawing Sheets

(30) Foreign Application Priority Data

| | | |
|---|---|---|
| Dec. 27, 2021 | (CN) | 202111611941.5 |
| Dec. 27, 2021 | (CN) | 202111635939.1 |
| Dec. 12, 2023 | (CN) | 202311704519.3 |

(51) Int. Cl.

| | |
|---|---|
| ***H02P 6/15*** | (2016.01) |
| ***H02P 6/28*** | (2016.01) |
| ***H02P 29/032*** | (2016.01) |

(56) References Cited

U.S. PATENT DOCUMENTS

| | | | | |
|---|---|---|---|---|
| 7,270,910 | B2 * | 9/2007 | Yahnker | B25F 5/008 429/61 |
| 2002/0175658 | A1 * | 11/2002 | Watts | H02J 7/977 320/150 |
| 2005/0202310 | A1 * | 9/2005 | Yahnker | B25F 5/008 429/62 |
| 2006/0267556 | A1 * | 11/2006 | Uehlein-Proctor | B25F 5/00 320/132 |
| 2009/0015208 | A1 * | 1/2009 | White | H01M 10/482 320/150 |
| 2011/0037423 | A1 | 2/2011 | Koda | |

FOREIGN PATENT DOCUMENTS

| | | | | |
|---|---|---|---|---|
| CN | 206674512 | U | 11/2017 | |
| CN | 108605490 | A | 10/2018 | |
| CN | 109713949 | A * | 5/2019 | |
| CN | 211671363 | U | 10/2020 | |
| CN | 113131806 | A | 7/2021 | |
| CN | 108964531 | A | 10/2021 | |
| CN | 109155601 | A | 6/2022 | |
| CN | 111034011 | A | 5/2023 | |
| EP | 0707378 | B1 | 11/2001 | |
| EP | 3584924 | A1 | 6/2022 | |
| JP | 2007330011 | A | 12/2007 | |
| JP | 2017205124 | A | 11/2017 | |
| JP | 2019083594 | A * | 5/2019 | F25D 11/00 |
| WO | 2007018440 | A1 | 2/2007 | |
| WO | 2015198569 | A1 | 12/2015 | |
| WO | 2018153424 | A1 | 8/2018 | |
| WO | 2019082682 | A1 | 5/2019 | |

OTHER PUBLICATIONS

International Search Report from application No. PCT/CN22/137389, dated Jul. 6, 2023, 7 pp.

Office Action from Canadian application No. 3,244,367, dated Jul. 16, 2025, 5 pp.

Wei et al., “A Position Sensorless Control Strategy for the BLDCM Based on a Flux-Linkage Function”, IEEE Transactions on Industrial Electronics, vol. 66, Issue 4, pp. 2570-2579, Jun. 7, 2018 ** document not available.

* cited by examiner

POWER TOOL

RELATED APPLICATION INFORMATION

This application is a continuation-in-part of International Application Number PCT/CN2022/137389, filed on Dec. 8, 2022, through which this application also claims the benefit under 35 U.S.C. § 119(a) of Chinese Patent Application No. 202111611940.0, filed on Dec. 27, 2021, Chinese Patent Application No. 202111611941.5, filed on Dec. 27, 2021, Chinese Patent Application No. 202111611939.8, filed on Dec. 27, 2021, and Chinese Patent Application No. 202111635939.1, filed on Dec. 27, 2021, which applications are incorporated herein by reference in their entireties.

This application also claims the benefit under 35 U.S.C. § 119(a) of Chinese Patent Application No. 202311704519.3, filed on Dec. 12, 2023, which application is incorporated herein by reference in its entirety.

TECHNICAL FIELD

The present application relates to the field of power tools and, in particular, to a power tool.

BACKGROUND

To increase the rotational speed of the electric motor in the full speed segment of a non-inductive motor, the lead angle and spread angle are generally introduced in the electric motor control to increase the conduction angle of the windings and improve the field weakening of the windings, thereby increasing the rotational speed of the electric motor. That is to say, the three-phase stator windings of the electric motor no longer adopt the simple conduction and commutation in twos, but also adopt the process of conduction and commutation in threes, so as to increase the conduction angle of the electric motor windings.

When the stator windings of the electric motor are turned on in twos, the floating phase during commutation occupies an electrical angle of 60° in one electrical cycle. Even if the commutation point detection is inaccurate, the next commutation lag does not occur. However, when the winding conduction angle is expanded to more than 120°, especially when the winding conduction angle is greater than 150°, the electrical cycle occupied by the floating phase is only 30°. If the commutation point detection is inaccurate, the next commutation lag occurs, the floating phase may be submerged during the next commutation, and the system failure occurs in severe cases. Common factors that cause inaccurate commutation point detection are described below. As shown in FIG. 1A, since the commutation speed is too fast or the program sampling interval is too large, the actual commutation point A' lags behind the ideal commutation point A. As shown in FIG. 1B, due to a relatively large load, the freewheeling time during the commutation of the electric motor is relatively long, and the ideal commutation point A appears during the freewheeling process and cannot be detected, causing the actually detected commutation point A' to lag much behind the ideal commutation point A. As shown in FIG. 1C, due to the pulse-width modulation (PWM), the smaller the PWM duty cycle, the smaller the probability of the ideal commutation point being detected. For example, when the PWM signal is a negative pulse, the rotor position cannot be detected, and the actual ideal commutation point A cannot be accurately identified, causing the actual commutation point A' to lag much behind the ideal commutation point A. The present application aims to solve the problems of the commutation lag and system failure caused by inaccurate commutation point detection due to the preceding reasons.

SUMMARY

A power tool includes an electric motor including a rotor and three-phase stator windings; a driver circuit having multiple semiconductor switching elements; a parameter detection module for detecting a working parameter of the operating electric motor; and a controller electrically connected to at least the driver circuit and the electric motor. The controller is configured to acquire the working parameter; and according to the working parameter, correct an electrical conduction angle of the stator windings of the operating electric motor.

In an example, the working parameter includes a phase voltage of a floating phase during a commutation process of the stator windings or a phase voltage or phase current when the stator windings are turned on.

In an example, the controller is configured to determine an actual commutation point of the stator windings during an operation process of the electric motor according to the phase voltage of the floating phase or the phase voltage when the stator windings are turned on; and adjust the electrical conduction angle of the stator windings according to the actual commutation point.

In an example, the controller is configured to determine an actual commutation point of the stator windings during an operation process of the electric motor according to a phase current when the stator windings are turned on; and adjust the electrical conduction angle of the stator windings according to the actual commutation point.

In an example, the controller is configured to determine an intermediate parameter according to the phase voltage of the floating phase during the commutation process of the stator windings and the phase voltage when the stator windings are turned on; and reduce a conduction angle of the stator windings when the intermediate parameter is not within a preset parameter range.

In an example, the conduction angle of the stator windings is greater than 120° and less than 180°.

In an example, the controller is configured to calculate the ratio of the phase voltage of the floating phase during the commutation process of the stator windings to the phase voltage when the stator windings are turned on; and reduce a conduction angle of the stator windings when the ratio is greater than a preset ratio.

In an example, the conduction angle of the stator windings is greater than 120° and less than 150°.

A power tool includes an electric motor including a rotor and three-phase stator windings, where the stator windings have an electrical conduction angle when the electric motor operates; a driver circuit having multiple semiconductor switching elements; a parameter detection module for detecting a working parameter of the operating electric motor; and a controller electrically connected to at least the driver circuit and the electric motor. The controller is configured to acquire the working parameter; and according to the working parameter, correct the electrical conduction angle of the stator windings of the operating electric motor. The electrical conduction angle of the stator windings is greater than 120° and less than 180°.

In an example, the working parameter includes a phase voltage of a floating phase during a commutation process of the stator windings or a phase voltage or phase current when the stator windings are turned on.

A power tool includes a power supply for supplying electrical energy; an electric motor including a rotor and three-phase stator windings; a driver circuit having multiple semiconductor switching elements for switching the conduction number of the stator windings of the electric motor; a parameter detection module for detecting a working parameter of the operating electric motor; and a controller electrically connected to at least the driver circuit and the electric motor. During a working process of the electric motor, the stator windings have a first conduction manner in which two-phase windings commutate and are turned on and a second conduction manner in which the three-phase windings commutate and are turned on. The controller is configured to acquire the working parameter; and when the working parameter is within a preset parameter range, control the stator windings to switch from the first conduction manner to the second conduction manner.

In an example, the controller is configured to set the conduction time of the second conduction manner according to the working parameter and a rotational speed of the electric motor and when the conduction time ends, control the stator windings to switch to the first conduction manner.

In an example, the working parameter includes a phase voltage of a floating phase during a commutation process of the stator windings and a phase voltage of a conduction phase of the stator windings.

In an example, the controller is configured to calculate the ratio of the phase voltage of the floating phase during the commutation process of the stator windings to the phase voltage when the stator windings are turned on; and when the ratio is within the preset parameter range, control the stator windings to switch from the first conduction manner to the second conduction manner.

In an example, the working parameter further includes the demagnetization time during the commutation process of the stator windings and the bus voltage of the electric motor; and the controller is configured to set the preset parameter range according to the demagnetization time or the bus voltage.

A power tool includes an electric motor including a rotor and three-phase stator windings, where the stator windings have an electrical conduction angle when the electric motor operates; a driver circuit having multiple semiconductor switching elements; a parameter detection module for detecting a working parameter of the operating electric motor; and a controller electrically connected to at least the driver circuit and the electric motor. The controller is configured to acquire the working parameter; and according to the working parameter, estimate the ideal commutation moment when the stator windings are turned on according to a preset conduction angle and control the stator windings to commutate at the ideal commutation moment.

In an example, the parameter detection module is used for detecting the working parameter of the floating phase during the commutation process of the stator windings; and the working parameter includes phase voltages of the floating phase at at least two moments during the commutation process of the stator windings or phase currents of the floating phase at at least two moments during the commutation process of the stator windings.

In an example, the controller is configured to estimate the rate of change of the phase voltage of the floating phase according to the phase voltages of the floating phase at at least two moments during the commutation process of the stator windings; and according to the rate of change, determine the ideal commutation moment of the stator windings when the stator windings are turned on according to a certain conduction angle.

In an example, a rotational speed detection unit is further included and used for detecting the rotational speed of the electric motor; and the controller is configured to, according to the rotational speed of the electric motor and the phase voltage of the floating phase at any moment, determine the ideal commutation moment of the stator windings when the stator windings are turned on according to a certain conduction angle.

In an example, the conduction angle of the stator windings is greater than 120° and less than 180°.

In an example, the conduction angle of the stator windings is greater than 120° and less than 150°.

A power tool includes an electric motor including a rotor and three-phase stator windings, where the stator windings have an electrical conduction angle when the electric motor operates; a driver circuit having multiple semiconductor switching elements; a parameter detection module for detecting a working parameter of the operating electric motor; and a controller electrically connected to at least the driver circuit and the electric motor. The controller is configured to acquire the working parameter; and according to the working parameter, estimate the ideal commutation moment when the stator windings are turned on according to a preset conduction angle and control the stator windings to commutate at the ideal commutation moment. The electrical conduction angle of the stator windings is greater than 120° and less than 150°.

In an example, the parameter detection module is used for detecting the working parameter of the floating phase during the commutation process of the stator windings of the electric motor; and the working parameter includes phase voltages of the floating phase at at least two moments during the commutation process of the stator windings or phase currents of the floating phase at at least two moments during the commutation process of the stator windings.

In an example, the controller is configured to estimate the rate of change of the phase voltage of the floating phase according to the phase voltages of the floating phase at at least two moments during the commutation process of the stator windings; and according to the rate of change, determine the ideal commutation moment of the stator windings when the stator windings are turned on according to a certain conduction angle.

In an example, a rotational speed detection unit is further included and used for detecting the rotational speed of the electric motor; and the controller is configured to, according to the rotational speed of the electric motor and the phase voltage of the floating phase at any moment, determine the ideal commutation moment of the stator windings when the stator windings are turned on according to a certain conduction angle.

A power tool includes an electric motor including a rotor and three-phase stator windings, where the stator windings have an electrical conduction angle when the electric motor operates; a driver circuit having multiple semiconductor switching elements; a parameter detection module for detecting a working parameter of the operating electric motor; and a controller electrically connected to at least the driver circuit and the electric motor and capable of outputting a PWM control signal to control the electric motor to operate. The controller is configured to acquire the working parameter of the electric motor; and adjust the duty cycle of the PWM control signal in real time according to a relationship between the working parameter and a preset parameter range to keep the electric motor operating at a constant target rotational speed.

In an example, the controller is configured to, when the working parameter is less than or equal to the preset parameter range, increase the duty cycle of the PWM control signal to increase the rotational speed of the electric motor; and when the working parameter is greater than the preset parameter threshold, reduce the duty cycle of the PWM control signal to reduce the rotational speed of the electric motor.

In an example, the working parameter includes the phase voltage of the floating phase during the commutation process of the stator windings, the phase current of the floating phase during the commutation process of the stator windings, or the phase voltage or phase current when the stator windings are turned on.

In an example, the controller is configured to determine an intermediate parameter according to the phase voltage of the floating phase during the commutation process of the stator windings and the phase voltage when the stator windings are turned on; and adjust the duty cycle of the PWM control signal according to a relationship between the intermediate parameter and the preset parameter threshold to keep the electric motor operating at the constant target rotational speed.

In an example, the controller is configured to calculate the ratio of the phase voltage of the floating phase during the commutation process of the stator windings to the phase voltage when the stator windings are turned on; when the ratio is less than or equal to the preset parameter threshold, increase the duty cycle of the PWM control signal to increase the rotational speed of the electric motor; and when the ratio is greater than the preset parameter threshold, reduce the duty cycle of the PWM control signal to reduce the rotational speed of the electric motor.

In an example, the controller is configured to set the preset parameter threshold according to a sampling cycle of the working parameter and the commutation time of the stator windings.

In an example, the range of the target rotational speed is greater than or equal to 100 RPM and less than or equal to 300 RPM.

A power tool includes an electric motor including a rotor and three-phase stator windings, where the stator windings have an electrical conduction angle when the electric motor operates; a driver circuit having multiple semiconductor switching elements; a parameter detection module for detecting a working parameter of the operating electric motor; and a controller electrically connected to at least the driver circuit and the electric motor and capable of outputting a PWM control signal to control the electric motor to operate. The controller is configured to acquire the working parameter of the electric motor; when the working parameter is less than or equal to the preset parameter threshold, increase the duty cycle of the PWM control signal to increase the rotational speed of the electric motor; and when the working parameter is greater than the preset parameter threshold, reduce the duty cycle of the PWM control signal to reduce the rotational speed of the electric motor.

In an example, the working parameter includes the phase voltage of the floating phase during the commutation process of the stator windings, the phase current of the floating phase during the commutation process of the stator windings, or the phase voltage or phase current when the stator windings are turned on.

In an example, the controller is configured to calculate the ratio of the phase voltage of the floating phase during the commutation process of the stator windings to the phase voltage when the stator windings are turned on; when the ratio is less than or equal to the preset parameter threshold, increase the duty cycle of the PWM control signal to increase the rotational speed of the electric motor; and when the ratio is greater than the preset parameter threshold, reduce the duty cycle of the PWM control signal to reduce the rotational speed of the electric motor.

A power tool includes an electric motor including a rotor and three-phase stator windings, where the stator windings have an electrical conduction angle when the electric motor operates; a driver circuit having multiple semiconductor switching elements; a parameter detection module for detecting a working parameter of the operating electric motor; and a controller electrically connected to at least the driver circuit and the electric motor. The controller is configured to, when the working parameter is greater than a first parameter threshold, control the driver circuit to change the conduction state and the electrical conduction angle of the stator windings of the operating electric motor. The electrical conduction angle of the stator windings is less than 120°.

In an example, the working parameter includes a working current of the electric motor.

In an example, when turned on and operating within a period of time, phase windings of the electric motor have a first electrical conduction angle and a second electrical conduction angle, where the first electrical conduction angle is greater than 120°, and the second electrical conduction angle is less than 120°.

In an example, the controller is configured to, when the working parameter is greater than the first parameter threshold, change the time when the phase windings of the electric motor are on at the first electrical conduction angle within the period of time and the time when the phase windings of the electric motor are on at the second electrical conduction angle within the period of time, where the average electrical conduction angle of the stator windings within the period of time is less than 120°.

In an example, the ratio of the time when the phase windings of the electric motor are on at the first electrical conduction angle within the period of time to the time when the phase windings of the electric motor are on at the second electrical conduction angle within the period of time is greater than or equal to 0 and less than 1.

In an example, the controller is configured to, when the working parameter is less than or equal to the first parameter threshold, control the stator windings to be turned on and operating at the first electrical conduction angle.

In an example, the controller is configured to, when the working parameter is less than or equal to a second parameter threshold, control the stator windings to be turned on and operating at the first electrical conduction angle.

A method for controlling a power tool is provided. The power tool includes an electric motor including a rotor and three-phase stator windings, where the stator windings have an electrical conduction angle when the electric motor operates; a driver circuit having multiple semiconductor switching elements; a parameter detection module for detecting a working parameter of the operating electric motor; and a controller electrically connected to at least the driver circuit and the electric motor. The method includes: when the working parameter is greater than a first parameter threshold, controlling the driver circuit to change the conduction state and the electrical conduction angle of the stator windings of the operating electric motor. The electrical conduction angle of the stator windings is less than 120°.

In an example, when turned on and operating within an electrical cycle, phase windings of the electric motor have a first electrical conduction angle and a second electrical conduction angle, where the first electrical conduction angle is greater than 120°, and the second electrical conduction angle is less than 120°.

In an example, when the working parameter is greater than the first parameter threshold, the time when the phase windings of the electric motor are on at the first electrical conduction angle within an electrical cycle and the time when the phase windings of the electric motor are on at the second electrical conduction angle within an electrical cycle are changed, where the average electrical conduction angle of the stator windings within the electrical cycle is less than 120°.

A power tool includes a battery pack for supplying electrical energy; an electric motor including a rotor and three-phase stator windings; a driver circuit having multiple semiconductor switching elements; a parameter detection module for detecting a working parameter of the operating electric motor; and a controller electrically connected to at least the battery pack, the driver circuit, and the electric motor. The controller is configured to acquire a power tool parameter; acquire a corresponding preset parameter range and a preset conduction angle according to the power tool parameter and a preset power tool parameter threshold; and control the working parameter to be within the preset parameter range so that the stator windings switch to the preset conduction angle corresponding to the preset parameter range.

In an example, the controller is configured to control the working parameter to be within the preset parameter range so that the stator windings switch to a conduction manner corresponding to the preset parameter range and based on the conduction manner, control the stator windings to switch to the corresponding preset conduction angle.

In an example, during a working process of the electric motor, the stator windings have a first conduction manner in which two-phase windings commutate and are turned on and a second conduction manner in which the three-phase windings commutate and are turned on.

In an example, the working parameter includes a phase voltage of a floating phase during a commutation process of the stator windings and a phase voltage of a conduction phase of the stator windings.

In an example, the power tool parameter includes a battery pack voltage, and the preset power tool parameter threshold includes a first voltage threshold and/or a second voltage threshold.

In an example, when the battery pack voltage is greater than the first voltage threshold and less than the second voltage threshold, the preset parameter range is proportional to the battery pack voltage; and when the battery pack voltage is greater than or equal to the second voltage threshold, the preset parameter range is a first parameter range.

In an example, when the preset parameter range is proportional to the battery pack voltage, the conduction manner is the second conduction manner, and the preset conduction angle is proportional to the battery pack voltage; and when the preset parameter range is the first parameter range, the conduction manner is the second conduction manner, and the preset conduction angle is a first conduction angle.

In an example, when the battery pack voltage is less than or equal to the first voltage threshold, the preset parameter range is 0 or the preset parameter range is a second parameter range, and the second parameter range is less than the first parameter range.

In an example, when the preset parameter range is 0, the conduction manner is the first conduction manner, and the preset conduction angle is 120°; and when the preset parameter range is the second parameter range, the conduction manner is the second conduction manner, and the preset conduction angle is a second conduction angle.

In an example, when the battery pack voltage is less than or equal to the first voltage threshold or the second voltage threshold, the preset parameter range is 0 or the preset parameter range is the second parameter range; and when the battery pack voltage is greater than the first voltage threshold or the second voltage threshold, the preset parameter range is the first parameter range, where the second parameter range is less than the first parameter range.

In an example, the power tool parameter includes a battery pack capacity, and the preset power tool parameter threshold includes a first capacity threshold and/or a second capacity threshold.

In an example, when the battery pack capacity is less than or equal to the first capacity threshold, the preset parameter range is 0 or the preset parameter range is a third parameter range; when the battery pack capacity is greater than the first capacity threshold and less than the second capacity threshold, the preset parameter range is proportional to the battery pack capacity; and when the battery pack capacity is greater than or equal to the second capacity threshold, the preset parameter range is a fourth parameter range.

In an example, when the preset parameter range is 0, the conduction manner is the first conduction manner, and the preset conduction angle is 120°; and when the preset parameter range is the third parameter range, the conduction manner is the second conduction manner, and the preset conduction angle is a third conduction angle.

In an example, when the preset parameter range is proportional to the battery pack capacity, the conduction manner is the second conduction manner, and the preset conduction angle is proportional to the battery pack voltage; and when the preset parameter range is the fourth parameter range, the conduction manner is the second conduction manner, and the preset conduction angle is a fourth conduction angle.

In an example, the power tool parameter includes the battery pack temperature or the power tool temperature, and the preset power tool parameter threshold includes a first temperature threshold and/or a second temperature threshold and a third temperature threshold and/or a fourth temperature threshold.

In an example, when the battery pack temperature is less than or equal to the first temperature threshold, the preset parameter range is a fifth parameter range, and the preset conduction angle is a fifth conduction angle; when the battery pack temperature is greater than the first temperature threshold and less than the second temperature threshold, the preset parameter range is inversely proportional to the battery pack temperature, and the preset conduction angle is inversely proportional to the battery pack temperature; and when the battery pack temperature is greater than or equal to the second temperature threshold, the preset parameter range is a sixth parameter range, and the preset conduction angle is a sixth conduction angle, where the sixth parameter range is less than the fifth parameter range, and the sixth conduction angle is less than the fifth conduction angle.

In an example, when the power tool temperature is less than or equal to the third temperature threshold, the preset parameter range is a seventh parameter range, and the preset conduction angle is a seventh conduction angle; when the power tool temperature is greater than the third temperature threshold and less than the fourth temperature threshold, the preset parameter range is inversely proportional to the power tool temperature, and the preset conduction angle is inversely proportional to the power tool temperature; and when the power tool temperature is greater than or equal to the fourth temperature threshold, the preset parameter range is an eighth parameter range, and the preset conduction angle is an eighth conduction angle, where the eighth parameter range is less than the seventh parameter range, and the eighth conduction angle is less than the seventh conduction angle.

In an example, when the stator windings adopt the second conduction manner, the conduction angle of the stator windings is greater than 120° and less than 180°.

A power tool includes a battery pack for supplying electrical energy; an electric motor including a rotor and three-phase stator windings; a driver circuit having multiple semiconductor switching elements; a parameter detection module for detecting a working parameter of the operating electric motor; and a controller electrically connected to at least the battery pack, the driver circuit, and the electric motor. During a working process of the electric motor, the stator windings have a first conduction manner in which two-phase windings commutate and are turned on and a second conduction manner in which the three-phase windings commutate and are turned on. The controller is configured to acquire the battery pack temperature; and according to the battery pack temperature, control the stator windings to adopt the first conduction manner or the second conduction manner.

A power tool includes a battery pack for supplying electrical energy; an electric motor including a rotor and three-phase stator windings; a driver circuit having multiple semiconductor switching elements; a parameter detection module for detecting a working parameter of the operating electric motor; and a controller electrically connected to at least the battery pack, the driver circuit, and the electric motor. The controller is configured to acquire a power tool parameter; acquire a corresponding preset parameter range according to the power tool parameter and a preset power tool parameter threshold; and control the working parameter to be within the preset parameter range so that the stator windings switch to the conduction manner corresponding to the preset parameter range.

DETAILED DESCRIPTION

Figure 1A:
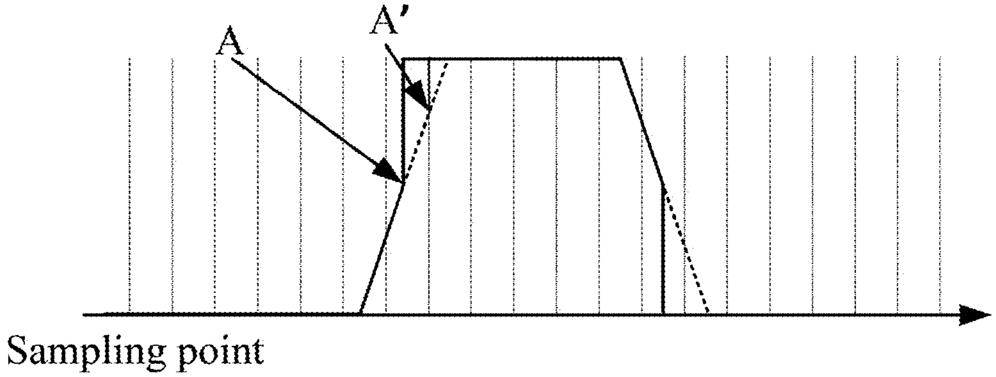
FIGS. 1A to 1C are schematic diagrams illustrating the cause of inaccurate commutation point detection in the existing art.
Figure 1B:
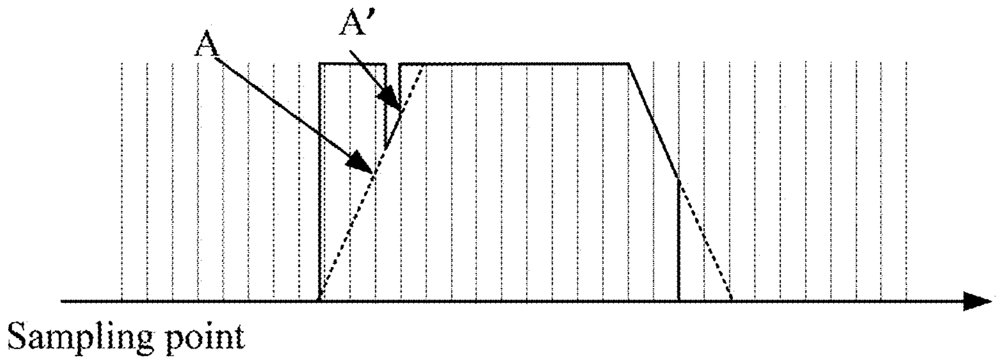
Figure 1C:
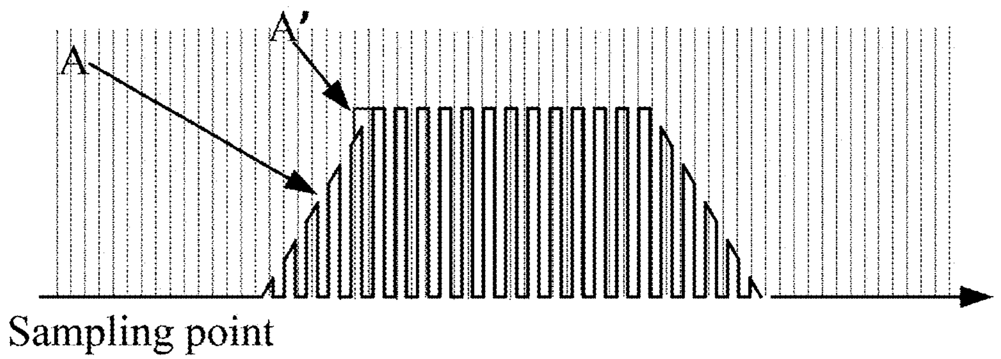

The present application is described below in detail in conjunction with the drawings and examples. It is to be understood that the examples described herein are intended to explain the present application and not to limit the present application. Additionally, it is to be noted that for ease of description, only part, not all, of structures related to the present application are illustrated in the drawings.

Unless otherwise defined, all technical and scientific terms used herein have the same meanings as those commonly understood by those skilled in the art to which the present application pertains. Terms used in the specification of the present application are only used for describing the examples and not intended to limit the present application. The term "and/or" used herein includes any or all combinations of one or more listed associated items.

Power tools to which the technical solutions of the present application are applicable include, but are not limited to, a sanding tool, an electric drill, an electric circular saw, a reciprocating saw, a miter saw, and any power tool that can use the brushless and sensorless electronic control manner. Other types of power tools that can use the essential content of the technical solutions disclosed below fall within the scope of the present application.

In the present application, electric motor windings, stator windings, or windings all represent metal windings in the electric motor. Unless otherwise specified, the preceding terms for the metal windings can be used universally.

Figure 2:
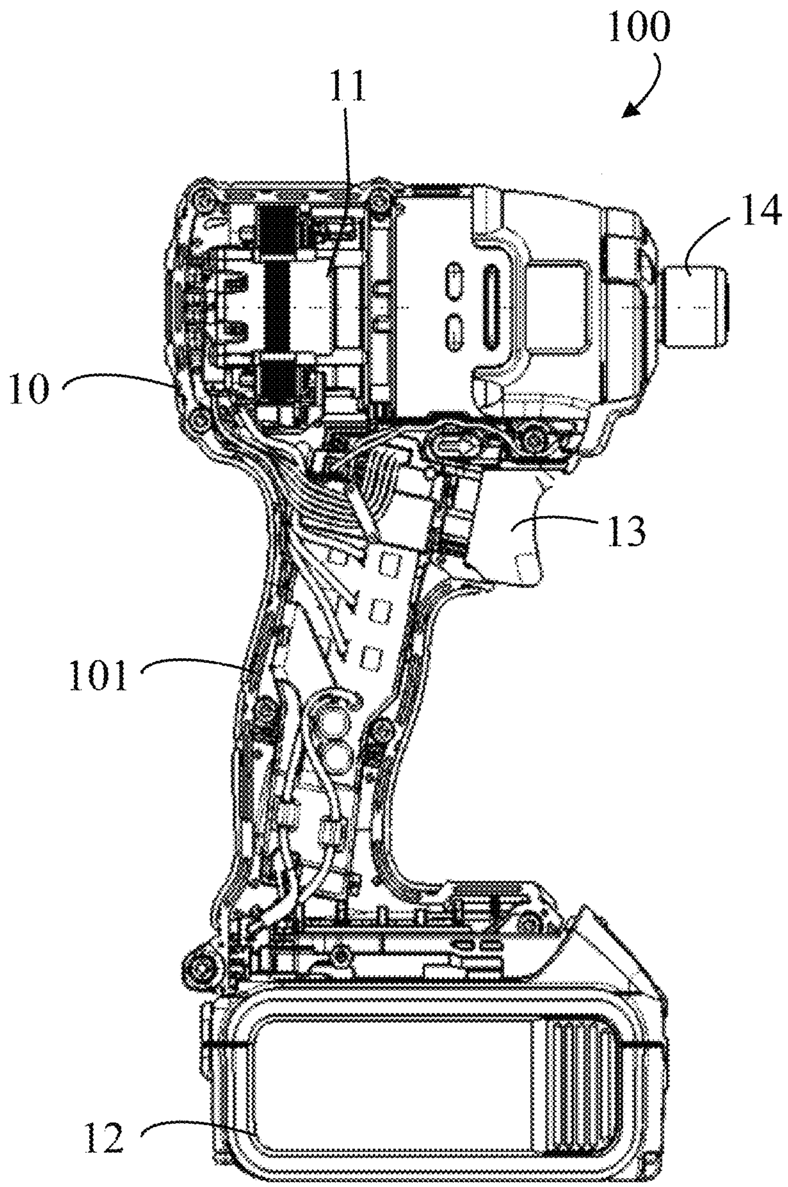
FIG. 2 is a structural view of a power tool according to an example of the present application.

In an example of the present application, referring to FIG. 2, an impact power tool is used as an example, and a power tool 100 includes at least a housing 10, an electric motor 11 in the housing, a power supply 12, a switch 13, a working head 14, and the like. The electric motor, a control circuit board, and a transmission structure (not shown) are disposed in the housing 10. The housing 10 is further formed with a grip 101 for a user to hold.

Figure 3:
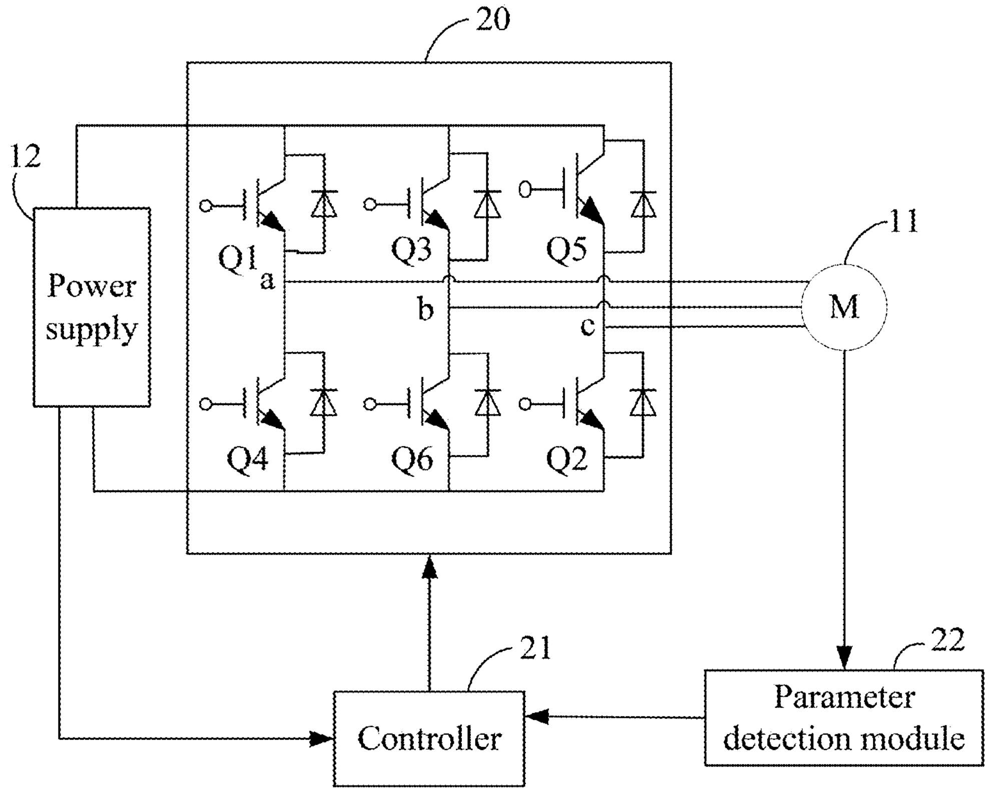
FIG. 3 is a circuit block diagram of a power tool according to an example of the present application.

Referring to the circuit block diagram of a power tool shown in FIG. 3, a driving system of the electric motor 11 may include at least a driver circuit 20, the power supply 12, a controller 21, a rotational speed detection module 22, and a current detection module 23.

In an example, the electric motor 11 is a brushless direct current electric motor (BLDC). In an example, the electric motor 11 is a sensorless BLDC. In an example, the electric motor 11 is a sensored BLDC. In the present application, the BLDC may be an inrunner or an outrunner, and the electric motor 11 includes at least three-phase stator windings A, B, and C in a star connection or a triangular connection.

In an example, the power supply 12 may optionally be an alternating current (AC) power supply, that is, AC mains power of 120 V or 220 V may be accessed through a power interface. In an example, the power supply 12 may optionally be a battery pack. The battery pack may be formed by a group of battery cells. For example, the battery cells may be connected in series into a single power supply branch to form a 1P battery pack. The output voltage of the battery pack is changed by a specific power supply control module such as a direct current-direct current (DC-DC) module so that a power supply voltage suitable for the driver circuit 20, the electric motor 11, and the like is outputted to supply power to them. It is to be understood by those skilled in the art that the DC-DC module is a mature circuit structure and may be selected accordingly according to the specific parameter requirements of the power tool.

The driver circuit 20 is electrically connected to the stator windings A, B, and C of the electric motor 11 and configured to transmit the current from the power supply 12 to the stator windings A, B, and C to drive the electric motor 10 to rotate. In an example, the driver circuit 20 includes multiple switching elements Q1, Q2, Q3, Q4, Q5, and Q6. A gate terminal of each switching element is electrically connected to the controller 21 and used for receiving a control signal from the controller 21. The drain or source of each switching element is connected to the stator windings A, B, and C of the electric motor 11. The switching elements Q1 to Q6 receive control signals from the controller 21 to change respective conduction states, thereby changing the current loaded to the stator windings A, B, and C of the electric motor 11 by the power supply 12. In an example, the driver circuit 20 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches, such as the IGBTs or the BJTs.

Figure 4:
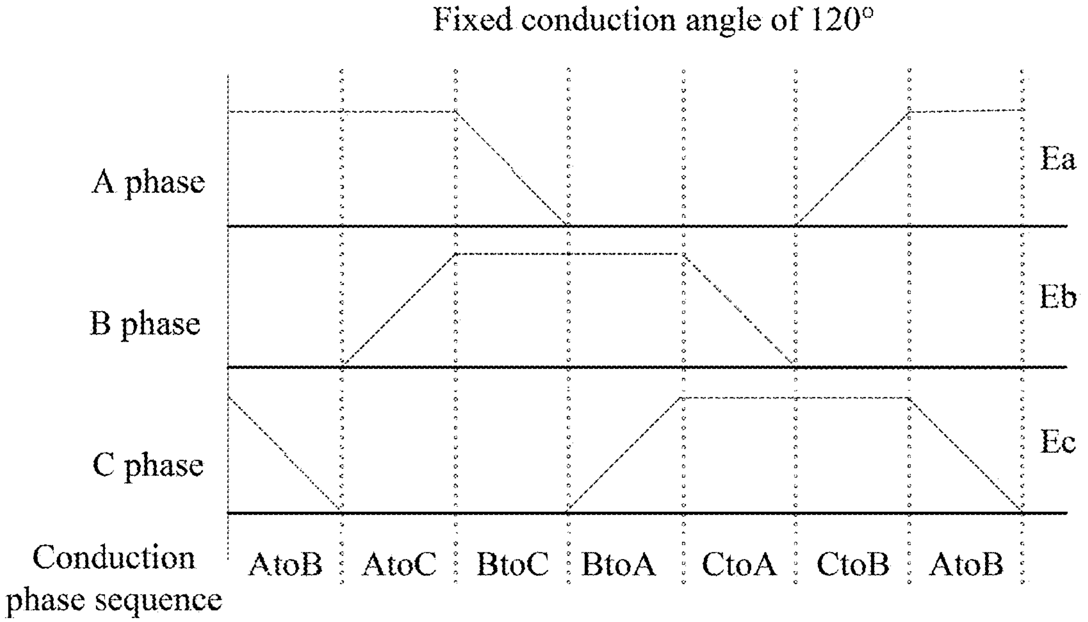
FIG. 4 is a schematic diagram of the periodic commutation when electric motor windings are turned on in twos according to an example of the present application.

To drive the electric motor 11 shown in FIG. 3 to rotate, the driver circuit 20 generally has at least six driving states, and each switching of the driving state corresponds to one commutation action of the electric motor. As shown in FIG. 4, a horizontal axis represents the commutation points of a stator within a cycle of 360°, and a vertical axis represents the back electromotive forces of the three-phase windings. In FIG. 4, a rotor rotates by 60° each time, and the electric motor commutes once. An interval from a commutation of the electric motor to the next commutation of the electric motor is defined as a commutation interval. As can be seen from FIG. 4, within a commutation cycle of 360°, six commutations exist, and the three-phase windings of the electric motor are all turned on for 120°, that is, the conduction angle is 120°. The commutation manner of the stator windings shown in FIG. 4 is generally referred to as a manner in which two phases of windings commutate and are turned on, that is, a pairwise conduction manner. In the pairwise conduction manner, the field weakening capability of the stator windings of the electric motor is not high, and the effect of increasing the rotational speed of the electric motor is not obvious.

Figure 5:
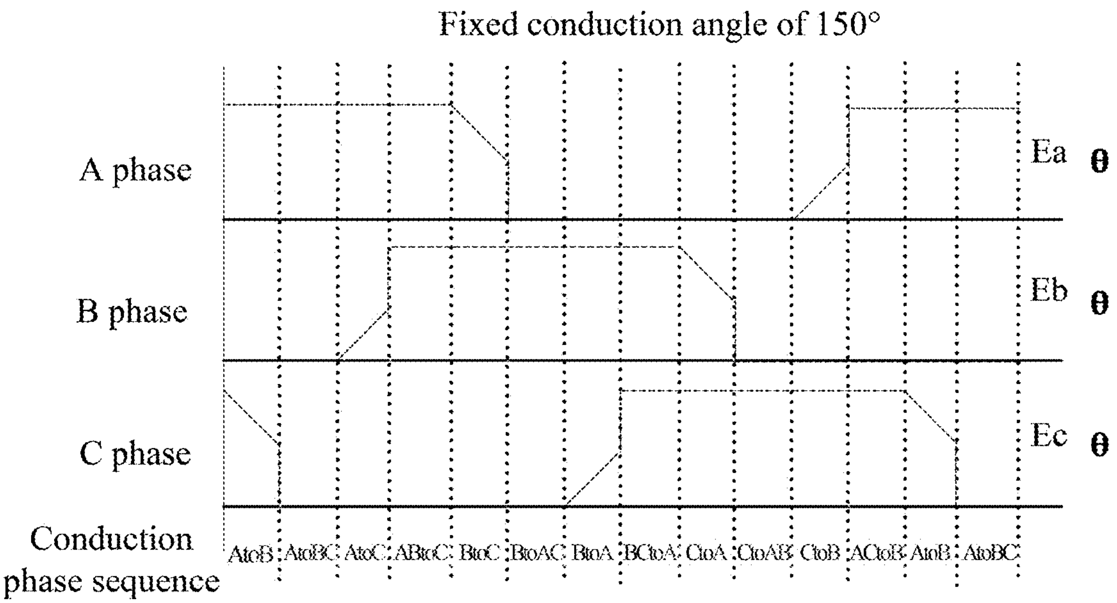
FIG. 5 is a schematic diagram of the periodic commutation when electric motor windings are turned on in threes according to an example of the present application.

Generally, to improve the field weakening capability and increase the rotational speed of the electric motor, the conduction angle is increased. For example, the conduction angle is increased such that the conduction angle is greater than 120°. To increase the conduction angle, the equivalent voltage applied to the stator windings is generally increased. For a three-phase electric motor, increasing the conduction phases of the stator windings means changing from two-phase winding commutation and conduction to three-phase winding commutation and conduction, that is, switching from conduction in twos to conduction in threes. For example, a commutation is performed every time when the rotor rotates by 30°, that is, twelve commutation actions are performed within a commutation cycle of 360° so that it can be ensured that the three-phase windings are all turned on during the commutation process of the three-phase windings of the electric motor, and the conduction angle is greater than 120°. For example, the conduction angle is 150°. As shown in FIG. 5, when the electric motor commutates every 30°, the stator windings switch from conduction in twos to conduction in threes, and at the next commutation, the stator windings switch from conduction in threes to conduction in twos. As can be seen from the comparison between FIGS. 5 and 4, the stator windings commutate in advance by 30°. Therefore, compared with the original conduction angle, the conduction angle of the stator windings increases by 30°, that is, the conduction angle is 150°.

Figure 6:
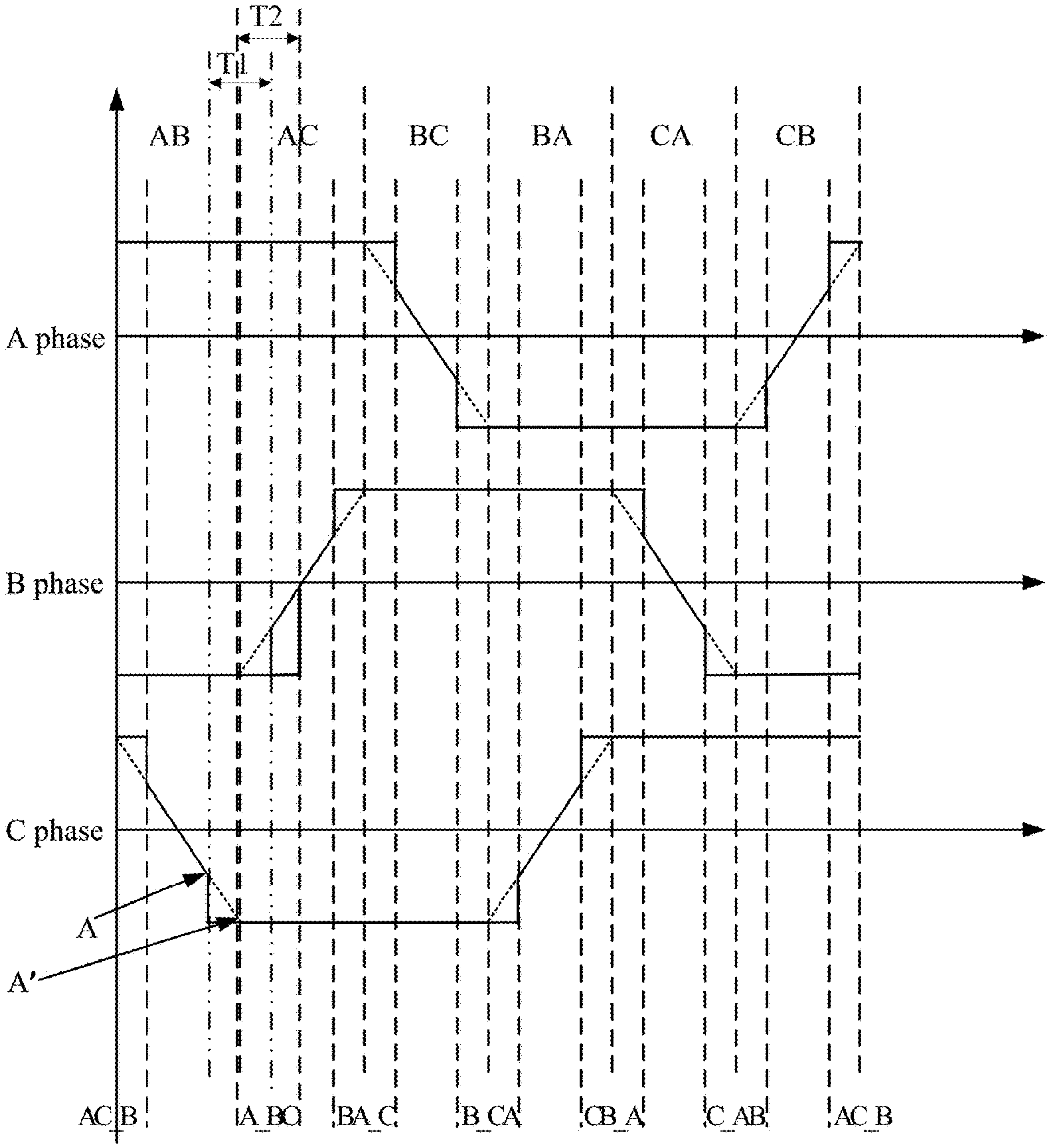
FIG. 6 is a schematic diagram illustrating that the floating phase is submerged when the electric motor windings are turned on in twos or threes for commutation according to an example of the present application.

Referring to the commutation timing diagram of another commutation manner with a conduction angle of 150° shown in FIG. 6, any phase winding of the electric motor commutates in advance by 15° at the rising edge of the commutation and lags the commutation by 15° at the falling edge. Therefore, a spread angle during the conduction process of one phase winding is 300 so that the conduction angle of any phase winding is 150°. In FIG. 5, the ideal commutation point is A, and the electrical cycle of A_BC conduction is T1. However, if the actual commutation point lags and is A' due to the preceding reasons and the controller still controls the commutation according to the conduction angle of 150°, then the electrical cycle of A_BC conduction is T2, causing the floating phase B to be partially submerged, leading to disorder or failure of the control system.

To avoid the preceding problem, the controller needs to adjust the conduction angle promptly and accurately according to the actual commutation point to prevent the floating phase from being partially or completely submerged due to the commutation lag.

In an example, as shown in FIG. 3, the power tool 100 includes a parameter detection module 22 that can detect the working parameter of the operating electric motor, for example, the phase voltage of the floating phase during the commutation process of the stator windings of the electric motor or the phase voltage or phase current when the stator windings are turned on. The floating phase is a phase that is not turned on. For example, if during conduction in twos, the AB phases are turned on and the C phase is not turned on, then the C phase is the floating phase. It is to be understood that the phase voltage of the conduction phase is constant, while the phase voltage of the floating phase changes between the lowest voltage and the highest voltage during conduction at a certain rate of change. In an example, the controller 21 can correct the electrical conduction angle of the stator windings of the operating electric motor according to the acquired working parameter of the electric motor, thereby matching the commutation process of the electric motor with the electrical conduction angle to avoid the following: the conduction angle does not change due to the commutation lag, leading to commutation disorder and system failure.

In an example, the controller 21 can calculate and obtain the actual commutation point of the electric motor according to the detected working parameter of the electric motor so that the electrical conduction angle of the stator windings can be adjusted according to the actual commutation point. In an optional example, the controller 21 may determine the actual commutation point according to the phase voltage of the floating phase or the phase voltage when the stator windings are turned on. For example, the controller may determine the actual commutation point according to any one or more parameters of the phase voltage of the floating phase, the phase voltage when the stator windings are turned on, or the phase current when the stator windings are turned on. Optionally, the controller may determine the actual commutation point according to the phase voltage of the floating phase or the phase voltage when the stator windings are turned on. Optionally, the controller may determine the actual commutation point according to the phase current when the stator windings are turned on.

It is to be noted that the actual commutation point of the stator windings determines the conduction angle of the windings, so the controller can adjust the conduction angle according to the actually determined commutation point to avoid the following: the floating phase is submerged due to the commutation lag, leading to system disorder.

Figure 7:
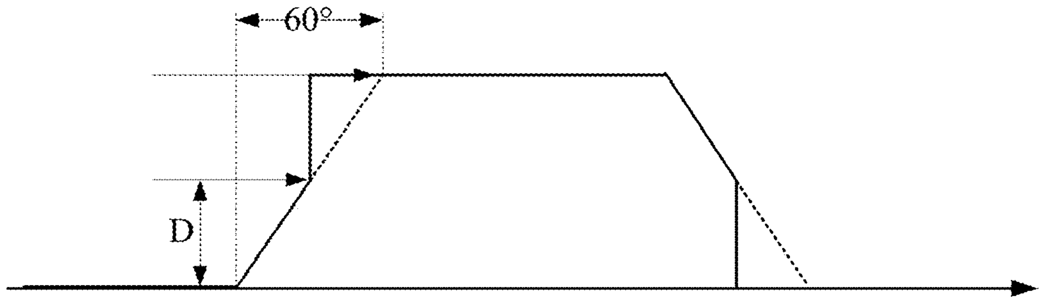
FIG. 7 is a schematic diagram of commutation points of stating windings according to an example of the present application.
Figure 8:
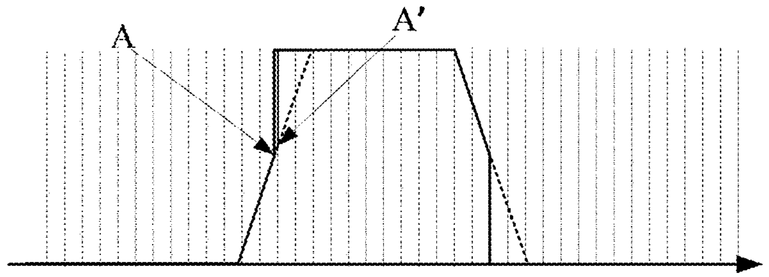
FIG. 8 is a schematic diagram of actual commutation points of stating windings according to an example of the present application.

In an example, the controller 21 may determine an intermediate parameter according to the phase voltage of the floating phase and the phase voltage when the stator windings are turned on, compare the intermediate parameter with a preset parameter range, and according to a comparison result, determine whether to adjust the electrical conduction angle of the windings and how to adjust the conduction angle. It is to be understood that when the intermediate parameter is within the preset parameter range, the lag is not caused, and the conduction angle does not need to be adjusted. However, when the intermediate parameter is not within the preset parameter range, the electrical angle when the stator windings are turned on can be reduced. For example, as shown in FIG. 7, the preset parameter range may be the interval range D in FIG. 7. When the intermediate parameter is within the range D, the conduction angle does not need to be adjusted. When the intermediate parameter is outside the range D, the conduction angle needs to be adjusted according to the actual intermediate parameter.

In this example, since the stator windings switch between conduction in twos and conduction in threes, the conduction angle is greater than 120° and less than 180°. When the intermediate parameter is not within the preset parameter range, the conduction angle is greater than 120° and less than 150°.

In the example of the present application, the actual commutation point of the electric motor windings can be accurately acquired by detecting the floating phase voltage and the conduction phase voltage, and according to the conduction angle of the windings, the problem of the inaccurate commutation point detection due to the inaccurate program detection, insufficient detection accuracy, too fast a rotational speed of the electric motor, too long a freewheeling time, or the like can be avoided, thereby ensuring that the entire control system has stable control performance.

Within the time of 360° shown in FIG. 5, the conduction sequence of the windings is: A_B→A_BC→A_C→AB_C→B_C→B_AC→B_A→BC_A→C_A→C_AB→C_B→AC_B→A_B. In A_B, the A phase is connected to the positive electrode of the power supply, and the B phase is connected to the negative electrode of the power supply; in A_BC, the A phase is connected to the positive electrode of the power supply, and the B phase and the C phase are connected to the negative electrode of the power supply. In the preceding commutation manner, when the electric motor commutates every 30°, the stator windings switch from a first conduction manner to a second conduction manner, that is, from conduction in twos to conduction in threes, and at the next commutation, the stator windings switch from conduction in threes to conduction in twos. For example, A_B refers to a pairwise conduction manner, and A_BC refers to a triplet conduction manner. Generally, the cutting smoothness when a power tool such as a circular saw operates in the light load or moderate load stage is an important criterion for evaluating the operating feel of the tool. For example, in the light load or moderate load stage, the higher the rotational speed of the electric motor, the better the operating feel of the tool. To ensure that the tool has a better operating feel in the moderate load or light load stage, the conduction and commutation of the stator windings of the electric motor are controlled by using the manners shown in FIG. 5, that is, the pairwise conduction manner and the triplet conduction manner are used. The conduction angle of the stator windings is increased so that the rotational speed of the electric motor is increased, thereby ensuring the operating feel of the tool.

It is to be understood that to make the tool have a better operating feel with different loads, corresponding to different loads of the electric motor, the rotational speeds of the electric motor are different, and the conduction angles of the stator windings are different. This requires a reasonable setting of the timing for switching from the first conduction manner to the second conduction manner such that the conduction angle of the stator windings can be adaptively changed when the load changes.

In this example, the controller 21 may acquire the parameter of the electric motor detected by the parameter detection module 22 and when the preceding parameter is within the preset parameter range, control the stator windings to switch from the first conduction manner to the second conduction manner. That is to say, when the electric motor windings operate in the pairwise conduction manner, if the controller 21 detects that the working parameter of the electric motor is within the preset parameter range, the controller 21 switches the conduction manner of the windings to the triplet conduction manner.

The working parameter of the electric motor may include the phase voltage of the floating phase during the commutation process of the stator windings and the phase voltage of the conduction phase of the stator windings. In an example, the controller may calculate the ratio of the phase voltage of the floating phase during the commutation process of the stator windings to the phase voltage when the stator windings are turned on and when the ratio is within the preset parameter range, control the windings to switch from conduction in twos to conduction in threes. Assuming that the phase voltage of the floating phase is V1 and the phase voltage of the conduction phase is V2, then when the value of V1/V2 is within the preset parameter range, the windings are controlled to switch the conduction manner to conduction in threes. In an example, the preset parameter range may be a numerical interval, for example, a numerical interval less than 1, such as the numerical interval [0.1, 0.8], (0.1, 0.8), [0.2, 0.8], (0.2, 0.8), [0.3, 0.8], (0.3, 0.8), [0.3, 0.7], (0.3, 0.7), [0.2, 0.7], (0.2, 0.7), [0.3, 0.6], (0.3, 0.6), [0.3, 0.5], (0.3, 0.5), [0.3, 0.4], (0.3, 0.4), [0.4, 0.7], (0.4, 0.7), [0.5, 0.7], or (0.5, 0.7).

In an example, the controller 21 may detect the load of the electric motor and set the preset parameter range according to the load. Generally, when the load of the electric motor is large, the preset parameter range is relatively small, that is, the preset parameter range is narrowed; and when the load is small, the preset parameter range is widened. For example, when the load of the electric motor is small and the value of V1/V2 is within (0.3, 0.7), the controller 21 controls the windings to switch the conduction manner to conduction in threes; and when the load of the electric motor is relatively large and the value of V1/V2 is within (0.6, 0.7), the controller 21 controls the windings to switch the conduction manner to conduction in threes.

Figure 9:
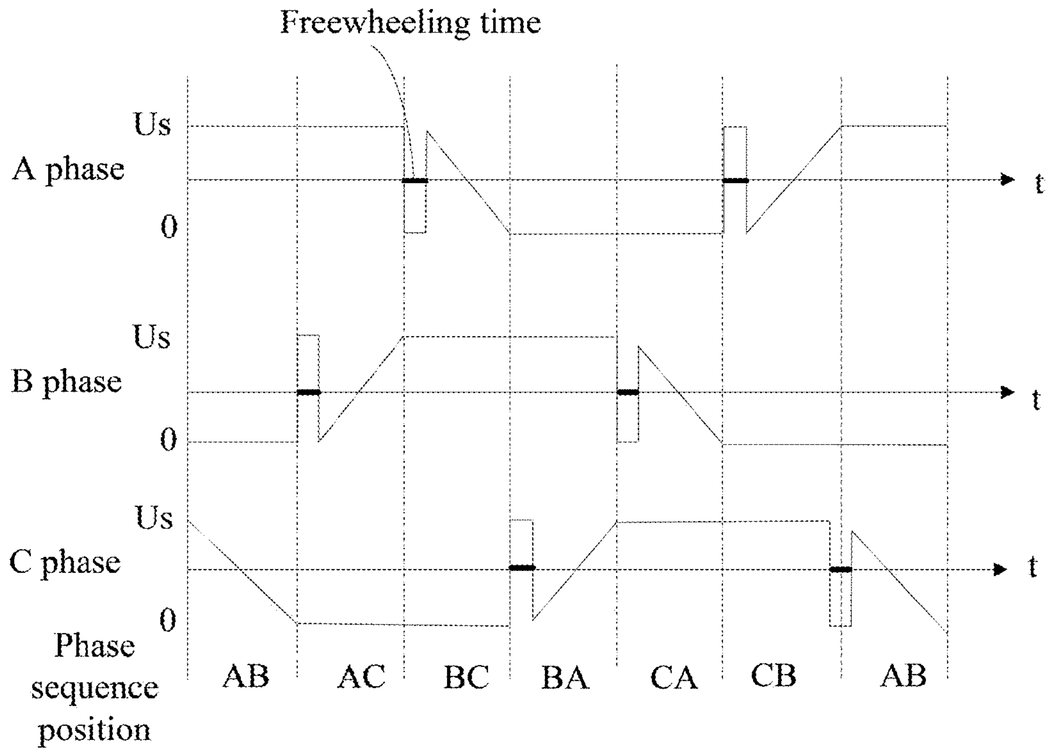
FIG. 9 is a schematic diagram of the freewheeling time during the commutation of stating windings according to an example of the present application.

In an example, the controller 21 may determine the magnitude of the load of the electric motor according to the working parameter of the electric motor. As shown in FIG. 9, when the electric motor 20 commutates each time, the phase voltage of the floating phase changes suddenly, and the voltage value after the sudden change is maintained for a period of time before the voltage value is eliminated. This period of time may be understood as the freewheeling time of the floating-phase winding when the electric motor commutates. It is to be understood that the higher the voltage of the electric motor windings, the longer the freewheeling time. That is to say, the magnitude of the load of the electric motor can be known from the freewheeling time during the commutation process of the electric motor. In an example, the controller 21 may accurately calculate and obtain the load of the electric motor according to the demagnetization time and the bus voltage of the electric motor.

Figure 10:
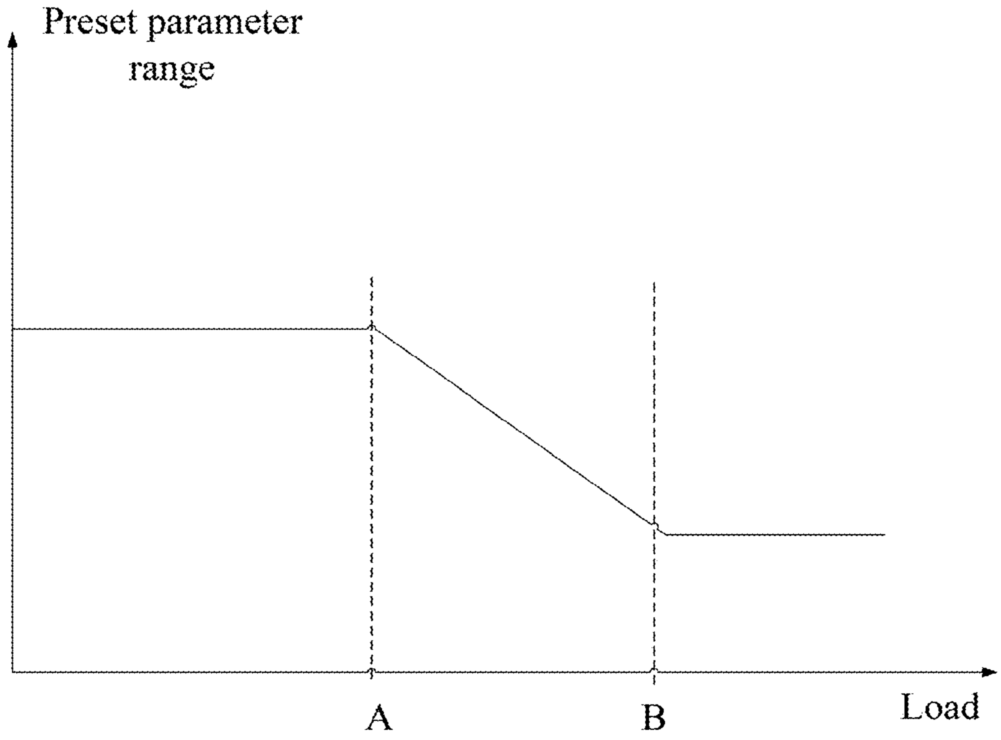
FIG. 10 is a schematic diagram illustrating the relationship between the load and the parameter range change according to an example of the present application.

In an example, as shown in FIG. 10, when the load of the electric motor is less than A, the corresponding preset parameter range is relatively large; when the load of the electric motor is greater than B, the corresponding preset parameter range is relatively small; and when the load of the electric motor is between A and B, the corresponding preset parameter range is a variation range. For example, when the load is between A and B, one load value corresponds to one preset parameter range; or the load values between A and B are divided into stages, and the loads in each stage correspond to one preset parameter range. In this example, the unit of A or B or the parameter that represents the magnitude of the load is not limited here. In different power tools, the magnitudes of A and B may be the same or different.

In this example, an appropriate parameter range is set as a basis for switching the conduction manners of the electric motor windings so that the magnitude of the conduction angle of the windings can be smoothly changed, a relatively large rotational speed can be obtained when the load is relatively small, the conduction angle of the tool can be reduced in time when the load is relatively large, the locked rotor current can be reduced, and the impact of load changes on the operating feel of the user can be reduced.

In some examples, when the parameter of the power tool 100 is the battery pack voltage, after the switch of the power tool 100 is turned on and before the electric motor 11 is started, the controller 21 may detect the battery pack voltage and according to the magnitude of the battery pack voltage, set the preset parameter range. Further, after the electric motor 11 is started, the controller 21 may control the stator windings to switch to the conduction manner and conduction angle that match the battery pack voltage. Generally, when the battery pack voltage is relatively small, the preset parameter range is relatively small, that is, the preset parameter range is narrowed, and the corresponding preset conduction angle is also relatively small. When the battery pack voltage is relatively large, the preset parameter range is widened, and the corresponding preset conduction angle is also relatively large. For example, when the battery pack voltage is relatively large, the preset parameter range is (0.3, 0.7), the preset conduction angle is 150°, and the value of V1/V2 is within (0.3, 0.7), then the controller 21 controls the windings to switch the conduction manner to conduction in threes and controls the conduction angle to be 150°; and when the battery pack voltage is relatively small, the preset parameter range is (0.4, 0.7), the preset conduction angle is 130°, and the value of V1/V2 is within (0.6, 0.7), then the controller 21 controls the stator windings to switch the conduction manner to conduction in threes and controls the conduction angle to be 130°. When the battery pack voltage is very small, the preset parameter range is 0, that is, no preset parameter range exists, the value of V1/V2 is not within the preset parameter range, the controller 21 controls the stator windings to switch the conduction manner to conduction in twos, and the conduction angle is 120°. Alternatively, when the battery pack voltage is very small, the preset parameter range is very small, which is (0.1, 0.2), the preset conduction angle is 122°, and the value of V1/V2 is within (0.1, 0.2), then the controller 21 controls the stator windings to switch the conduction manner to conduction in threes and controls the conduction angle to be 122°.

Figure 11:
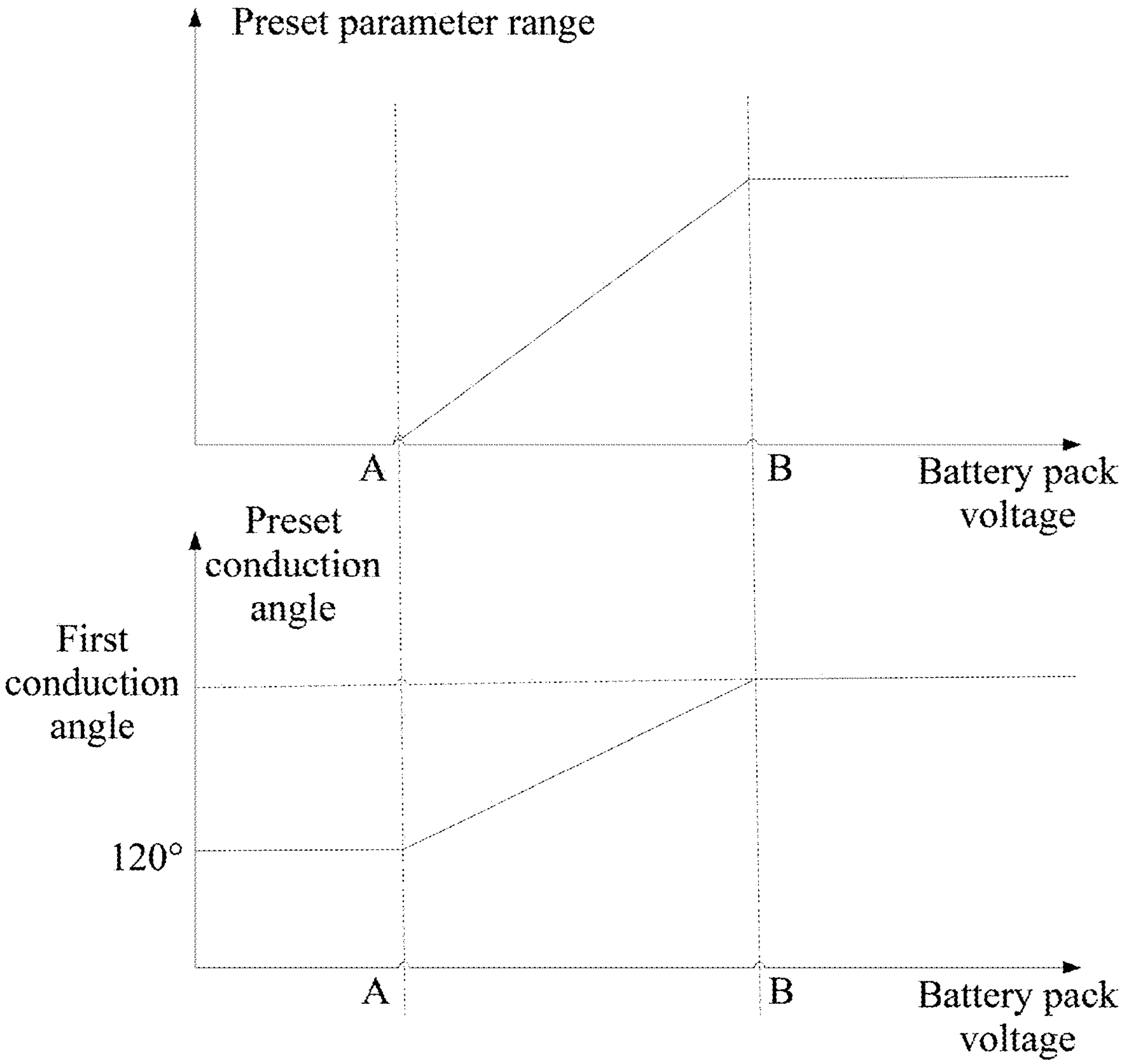
FIG. 11 is a schematic diagram illustrating the relationship between the battery pack voltage and the parameter range change and the relationship between the battery pack voltage and the preset conduction angle according to an example of the present application.

In some examples, as shown in FIG. 11, a preset parameter threshold of the power tool 100 corresponding to the battery pack voltage includes a first voltage threshold A and a second voltage threshold B. When the battery pack voltage is less than or equal to the first voltage threshold A, the corresponding preset parameter range is 0 and the preset conduction angle is 120°. Then, after the electric motor 11 is started, the value of V1/V2 is not within the preset parameter range, the controller 21 controls the stator windings to switch the conduction manner to conduction in twos, and the conduction angle is 120°. When the battery pack voltage is greater than or equal to the second voltage threshold B, the corresponding preset parameter range is a first parameter range, the first parameter range is relatively large, and the preset conduction angle is a first conduction angle. Then, after the electric motor 11 is started, the controller 21 controls the value of V1/V2 to be within the first parameter range so that the stator windings switch the conduction manner to conduction in threes, and the conduction angle of the stator windings is controlled to be the first conduction angle. When the battery pack voltage is greater than the first threshold A and less than the second threshold B, that is, when the battery pack voltage is between the first voltage threshold A and the second voltage threshold B, the corresponding preset parameter range is a variation range, the preset parameter range is proportional to the battery pack voltage, the preset conduction angle is proportional to the battery pack voltage, and the preset conduction angle is between 120° and the first conduction angle. For example, when the battery pack voltage is between the first voltage threshold A and the second voltage threshold B, one voltage value corresponds to one preset parameter range or one preset conduction angle; or the voltage values between the first voltage threshold A and the second voltage threshold B are divided into stages, and the voltages in each stage correspond to one preset parameter range or one preset conduction angle. Then, after the electric motor 11 is started, the controller 21 controls the value of V1/V2 to be within the corresponding preset parameter range so that the stator windings switch the conduction manner to conduction in threes, and the conduction angle of the stator windings is a corresponding conduction angle proportional to the voltage. In this example, the unit of the first voltage threshold A or the second voltage threshold B or the parameter that represents the magnitude of the battery pack voltage is not limited here. Battery packs with different capacities may have same or different first voltage thresholds A and second voltage thresholds B, which is not limited in the present application.

Figure 12:
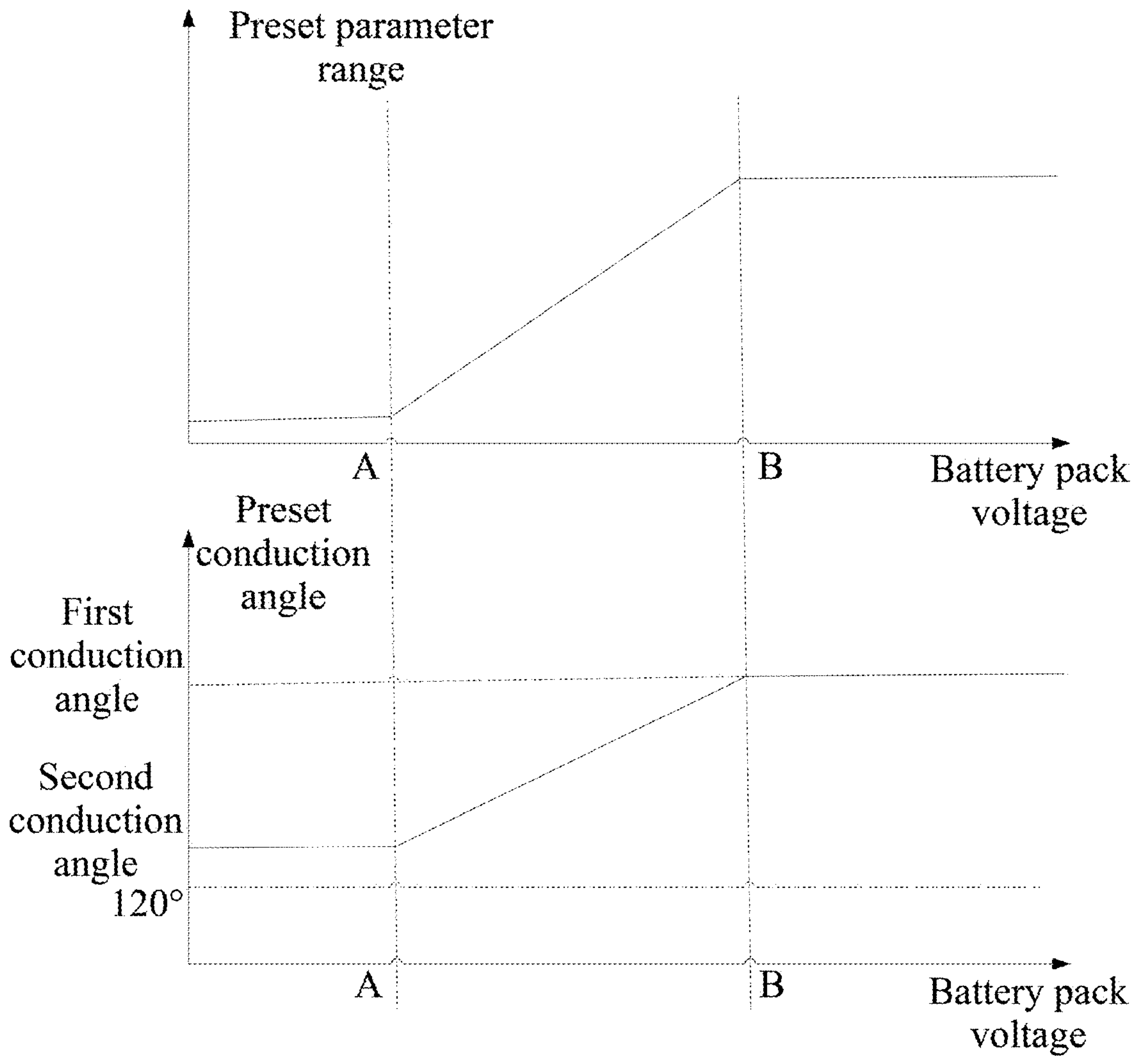
FIG. 12 is another schematic diagram illustrating the relationship between the battery pack voltage and the parameter range change and the relationship between the battery pack voltage and the preset conduction angle according to an example of the present application.

In some examples, as shown in FIG. 12, when the battery pack voltage is less than or equal to the first voltage threshold A, the corresponding preset parameter range may be a second parameter range, the second parameter range is relatively small, and the corresponding preset conduction angle is a second conduction angle. Then, after the electric motor 11 is started, the controller 21 controls the value of V1/V2 to be within the second parameter range so that the stator windings switch the conduction manner to conduction in threes, and the conduction angle of the stator windings is controlled to be the second conduction angle. The second parameter range is less than the first parameter range, and the second conduction angle is less than the first conduction angle. The values of the second conduction angle and the first conduction angle are determined according to empirical values.

Figure 13:
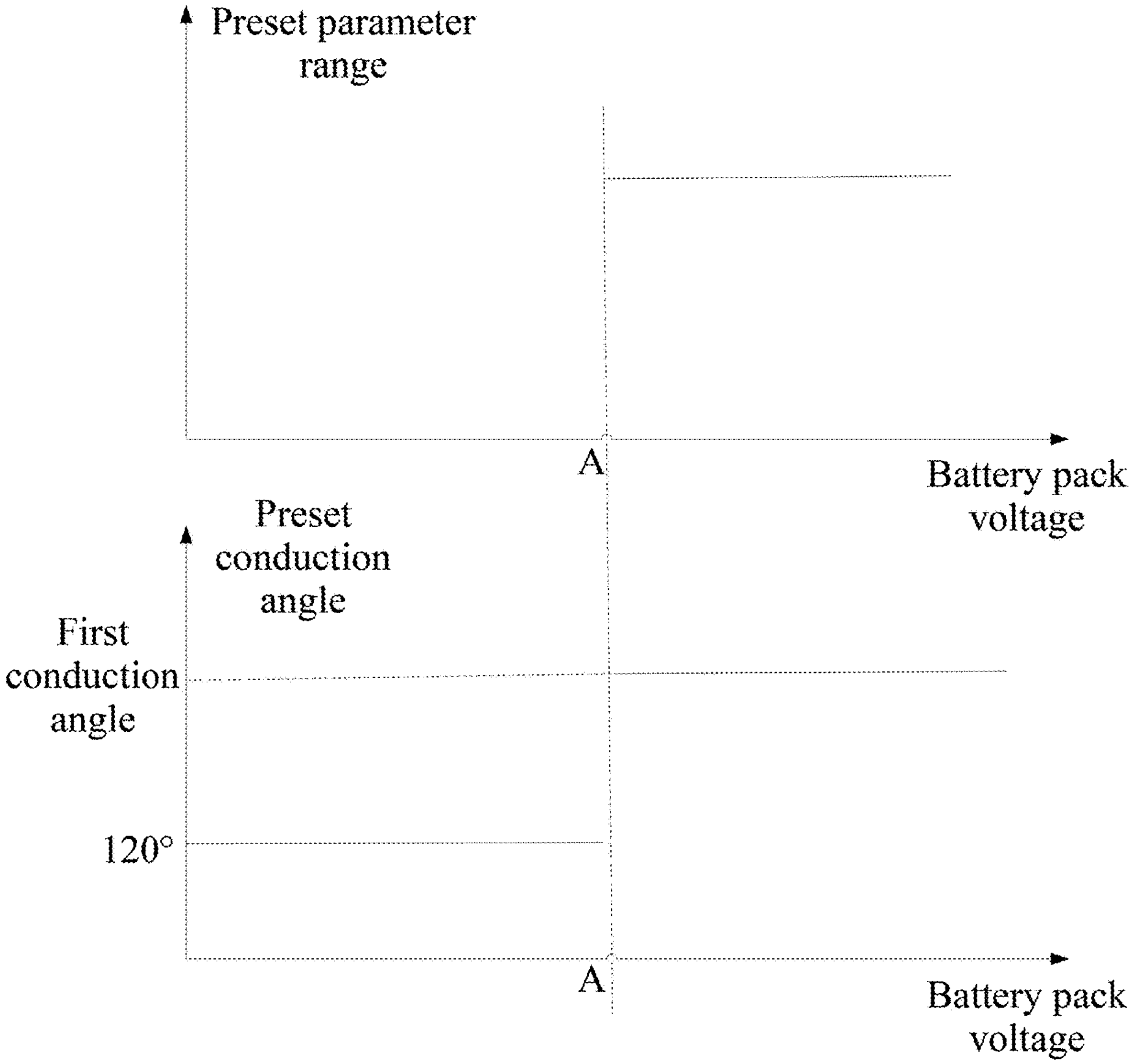
FIG. 13 is another schematic diagram illustrating the relationship between the battery pack voltage and the parameter range change and the relationship between the battery pack voltage and the preset conduction angle according to an example of the present application.

In some examples, as shown in FIG. 13, the preset parameter threshold of the power tool 100 corresponding to the battery pack voltage includes only the first voltage threshold A (or the second voltage threshold B). When the battery pack voltage is less than or equal to the first voltage threshold A, the corresponding preset parameter range is 0 and the preset conduction angle is 120°. After the electric motor 11 is started, the controller 21 controls the stator windings to switch the conduction manner to conduction in twos, and the conduction angle is 120°. When the battery pack voltage is greater than the first voltage threshold A, the corresponding preset parameter range is the first parameter range, and the preset conduction angle is the first conduction angle. Then, after the electric motor 11 is started, the controller 21 controls the value of V1/V2 to be within the first parameter range so that the stator windings switch the conduction manner to conduction in threes, and the conduction angle of the stator windings is controlled to be the first conduction angle. In addition, when the battery pack voltage is less than or equal to the first voltage threshold A, the corresponding preset parameter range may be the second parameter range, and the preset conduction angle may be the second conduction angle.

In some examples, when the parameter of the power tool 100 is the battery pack capacity, after the switch of the power tool 100 is turned on and before the electric motor 11 is started, the controller 21 may detect the battery pack capacity through communication with the battery pack, or the battery pack actively transmits capacity information of the battery pack to the controller 21. The controller 21 sets the preset parameter range according to the battery pack capacity. Further, after the electric motor 11 is started, the controller 21 may control the stator windings to switch to the conduction manner and conduction angle that match the battery pack capacity. The preset parameter range set according to the battery pack capacity is similar to the preset parameter range set according to the battery pack voltage, and the details are not repeated here.

In some examples, the preset power tool parameter threshold corresponding to the battery pack capacity includes a first capacity threshold C and a second capacity threshold D. When the battery pack capacity is less than or equal to the first capacity threshold C, the corresponding preset parameter range is 0 and the preset conduction angle is 120°. Then, after the electric motor 11 is started, the value of V1/V2 is not within the preset parameter range, the controller 21 controls the stator windings to switch the conduction manner to conduction in twos, and the conduction angle is 120°. Alternatively, when the battery pack capacity is less than or equal to the first capacity threshold C, the corresponding preset parameter range is a third parameter range, the third parameter range is relatively small, and the preset conduction angle is a third conduction angle. Then, after the electric motor 11 is started, the controller 21 controls the value of V1/V2 to be within the third parameter range so that the stator windings switch the conduction manner to conduction in threes, and the conduction angle of the stator windings is controlled to be the third conduction angle. When the battery pack capacity is greater than the first capacity threshold C and less than the second capacity threshold D, the corresponding preset parameter range is proportional to the battery pack capacity. Then, after the electric motor 11 is started, the controller 21 controls the value of V1/V2 to be within the corresponding preset parameter range so that the stator windings switch the conduction manner to conduction in threes, and the conduction angle of the stator windings is a corresponding conduction angle proportional to the capacitance. The specific content in which the preset parameter range is proportional to the battery pack capacity is similar to the specific content in which the preset parameter range is proportional to the battery pack voltage, and the details are not repeated here. When the battery pack capacity is greater than the second capacity threshold D, the corresponding preset parameter range is a fourth parameter range, the fourth parameter range is relatively large, and the preset conduction angle is a fourth conduction angle. Then, after the electric motor 11 is started, the controller 21 controls the value of V1/V2 to be within the fourth parameter range so that the stator windings switch the conduction manner to conduction in threes, and the conduction angle of the stator windings is controlled to be the fourth conduction angle. The fourth parameter range is greater than the third parameter range, and the fourth conduction angle is greater than the third conduction angle. The values of the fourth conduction angle and the third conduction angle are determined according to empirical values. In this example, the unit of the first capacity threshold C or the second capacity threshold D or the parameter that represents the magnitude of the battery pack capacity is not limited here. Battery packs with different capacities have different first capacity thresholds C and second capacity thresholds D.

In some examples, similar to the battery pack voltage, the preset parameter threshold of the power tool 100 corresponding to the battery pack capacity includes only the first capacity threshold C (or the second capacity threshold D). When the battery pack capacity is less than or equal to the first capacity threshold C, the corresponding preset parameter range is 0, and the preset conduction angle is 120°; or when the battery pack capacity is less than or equal to the first capacity threshold C, the corresponding preset parameter range is the third parameter range, and the preset conduction angle is the third conduction angle. When the battery pack capacity is greater than the first capacity threshold C, the corresponding preset parameter range is the fourth parameter range, and the preset conduction angle is the fourth conduction angle. For the case where the controller 21 controls the value of V1/V2 and the conduction manner, reference is made to the battery pack voltage, and the details are not repeated here.

In some examples, when the parameter of the power tool 100 is the battery pack temperature, after the switch of the power tool 100 is turned on and before the electric motor 11 is started, the controller 21 may detect the battery pack temperature or the battery pack actively transmits temperature information of the battery pack to the controller 21, and according to the magnitude of the battery pack temperature, the controller 21 sets the preset parameter range. Further, after the electric motor 11 is started, the controller 21 may control the stator windings to switch to the conduction manner and conduction angle that match the battery pack temperature.

In some examples, when the parameter of the power tool 100 is the temperature of the power tool 100, after the switch of the power tool 100 is turned on and before the electric motor 11 is started, the controller 21 may acquire the temperature of the power tool 100 and according to the temperature of the power tool 100, set the preset parameter range. Further, after the electric motor 11 is started, the controller 21 may control the stator windings to switch to the conduction manner and conduction angle that match the temperature of the power tool 100.

Generally, when the battery pack temperature or the temperature of the power tool 100 is relatively low, the preset parameter range is relatively large, that is, the preset parameter range is widened, and the preset conduction angle is also relatively large. When the battery pack temperature or the temperature of the power tool 100 is relatively high, the preset parameter range is narrowed, and the preset conduction angle is also relatively small. For example, the case where the preset parameter range of the battery pack temperature is the same as the preset parameter range of the temperature of the power tool 100, and the preset conduction angle corresponding to the preset parameter range of the battery pack temperature is the same as the preset conduction angle corresponding to the preset parameter range of the temperature of the power tool 100 is used as an example for detailed description. When the battery pack temperature or the temperature of the power tool 100 is relatively small, the preset parameter range is (0.2, 0.8), the preset conduction angle is 160°, and the value of V1/V2 is within (0.2, 0.8), then the controller 21 controls the stator windings to switch the conduction manner to conduction in threes and controls the conduction angle to be 160°. When the battery pack temperature or the temperature of the power tool 100 is relatively high, the preset parameter range is (0.5, 0.7), the preset conduction angle is 140°, and the value of V1/V2 is within (0.5, 0.7), then the controller 21 controls the stator windings to switch the conduction manner to conduction in threes and controls the conduction angle to be 140°. When the battery pack temperature or the temperature of the power tool 100 is very high, the preset parameter range is 0, that is, no preset parameter range exists, the value of V1/V2 is not within the preset parameter range, the controller 21 controls the stator windings to switch the conduction manner to conduction in twos, and the conduction angle is 120°. Alternatively, when the battery pack temperature or the temperature of the power tool 100 is very high, the preset parameter range is very small, which is (0.1, 0.2), the preset conduction angle is 124°, and the value of V1/V2 is within (0.1, 0.2), then the controller 21 controls the stator windings to switch the conduction manner to conduction in threes and controls the conduction angle to be 124°. In addition, the preset parameter range of the battery pack temperature may be different from the preset parameter range of the temperature of the power tool 100, which is not limited in the present application.

Figure 14:
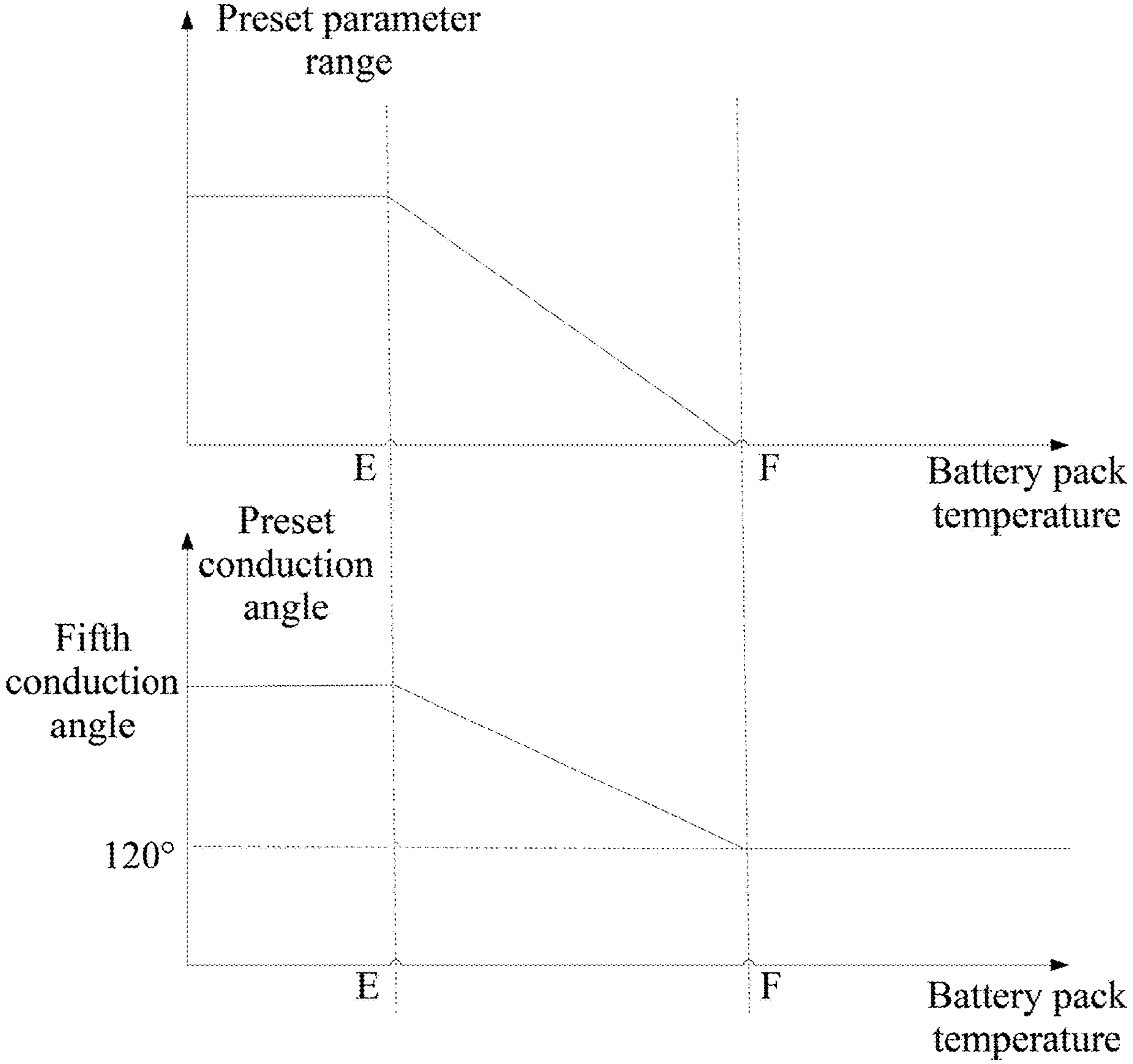
FIG. 14 is a schematic diagram illustrating the relationship between the battery pack temperature and the parameter range change and the relationship between the battery pack temperature and the preset conduction angle according to an example of the present application.
Figure 15:
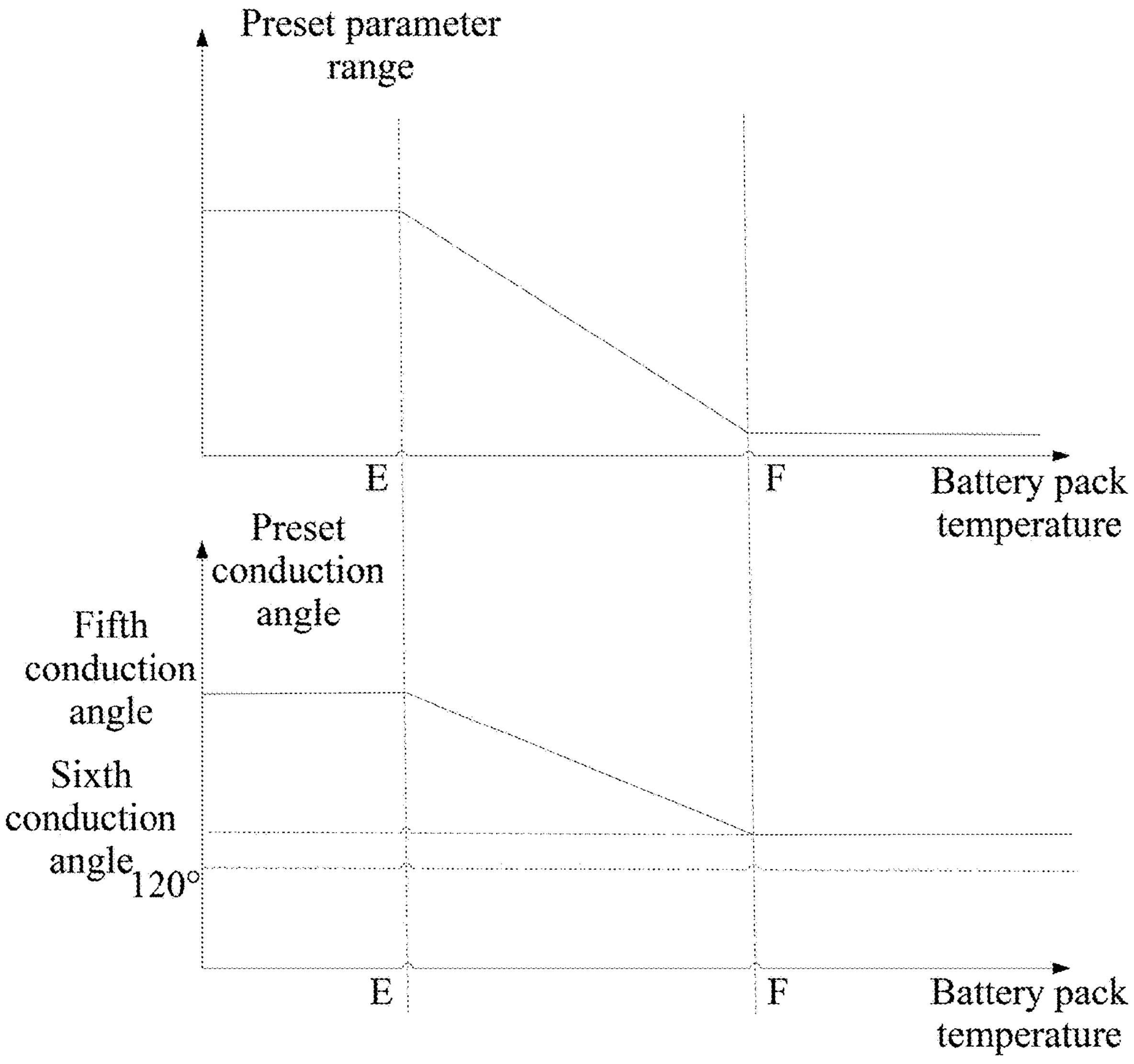
FIG. 15 is another schematic diagram illustrating the relationship between the battery pack temperature and the parameter range change and the relationship between the battery pack temperature and the preset conduction angle according to an example of the present application.

In some examples, as shown in FIG. 14, the preset parameter threshold of the power tool 100 corresponding to the battery pack temperature includes a first temperature threshold E and a second temperature threshold F. When the battery pack temperature is less than or equal to the first temperature threshold E, the corresponding preset parameter range is a fifth parameter range, the fifth parameter range is relatively large, and the corresponding preset conduction angle is a fifth conduction angle. Then, after the electric motor 11 is started, the controller 21 controls the value of V1/V2 to be within the fifth parameter range so that the stator windings switch the conduction manner to conduction in threes, and the conduction angle of the stator windings is the fifth conduction angle. When the battery pack temperature is greater than the first temperature threshold E and less than the second temperature threshold F, the corresponding preset parameter range is a variation range, the preset parameter range is inversely proportional to the battery pack temperature, and the preset conduction angle is also inversely proportional to the battery pack temperature. For example, when the battery pack temperature is between the first temperature threshold E and the second temperature threshold F, one temperature corresponds to one preset parameter range or one preset conduction angle; or the temperatures between the first temperature threshold E and the second temperature threshold F are divided into stages, and the temperatures in each stage correspond to one preset parameter range or one preset conduction angle. Then, after the electric motor 11 is started, the controller 21 controls the value of V1/V2 to be within the corresponding preset parameter range so that the stator windings switch the conduction manner to conduction in threes, and the conduction angle of the stator windings is a corresponding conduction angle inversely proportional to the temperature. When the battery pack temperature is greater than or equal to the second temperature threshold F, the corresponding preset parameter range is 0. Then, after the electric motor 11 is started, the value of V1/V2 is not within the preset parameter range, the controller 21 controls the stator windings to switch the conduction manner to conduction in twos, and the corresponding conduction angle is 120°. Alternatively, as shown in FIG. 15, when the battery pack temperature is greater than or equal to the second temperature threshold F, the corresponding preset parameter range is a sixth parameter range, and the corresponding preset conduction angle is a sixth conduction angle. Then, after the electric motor 11 is started, the controller 21 controls the value of V1/V2 to be within the sixth parameter range so that the stator windings switch the conduction manner to conduction in threes, and the conduction angle of the stator windings is controlled to be the sixth conduction angle. The sixth parameter range is less than the fifth parameter range, and the sixth conduction angle is less than the fifth conduction angle. The values of the sixth conduction angle and the fifth conduction angle are determined according to empirical values.

Figure 16:
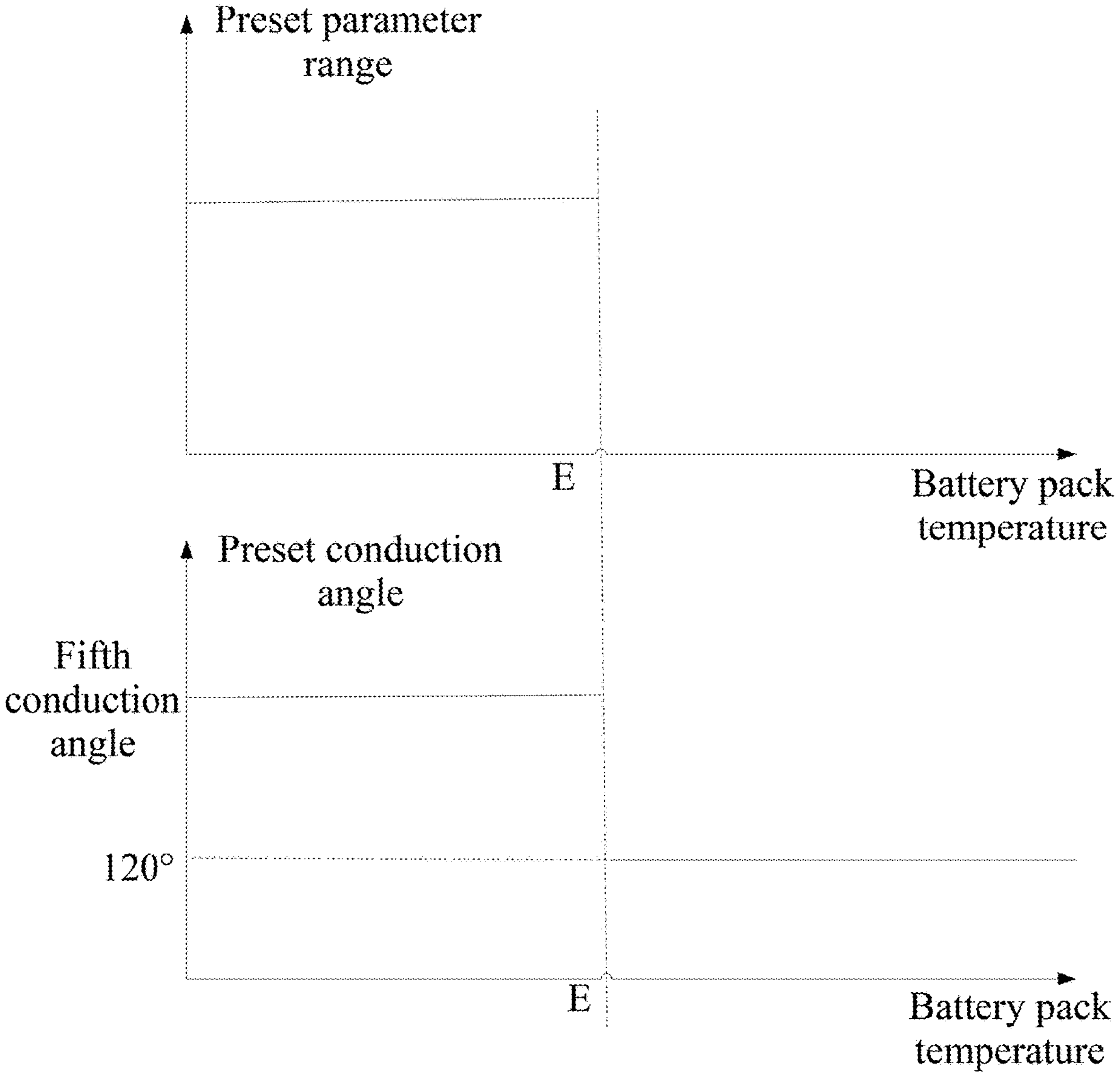
FIG. 16 is another schematic diagram illustrating the relationship between the battery pack temperature and the parameter range change and the relationship between the battery pack temperature and the preset conduction angle according to an example of the present application.

In some examples, as shown in FIG. 16, the preset parameter threshold of the power tool 100 corresponding to the battery pack temperature includes only the first temperature threshold E (or the second temperature threshold F). When the battery pack temperature is less than or equal to the first temperature threshold E, the corresponding preset parameter range is the fifth parameter range, and the corresponding preset conduction angle is the fifth conduction angle. Then, after the electric motor 11 is started, the controller 21 controls the value of V1/V2 to be within the fifth parameter range so that the stator windings switch the conduction manner to conduction in threes, and the conduction angle of the stator windings is the fifth conduction angle. When the battery pack temperature is greater than the first temperature threshold E, the corresponding preset parameter range is 0 and the preset conduction angle is 120°. After the electric motor 11 is started, the controller 21 controls the stator windings to switch the conduction manner to conduction in twos, and the conduction angle is 120°. In addition, when the battery pack temperature is greater than the first temperature threshold E, the corresponding preset parameter range may be the sixth parameter range, and the corresponding preset conduction angle is the sixth conduction angle.

In some examples, the preset parameter threshold of the power tool 100 corresponding to the temperature of the power tool 100 includes a third temperature threshold G and a fourth temperature threshold H. The third temperature threshold G may be the same as or different from the first temperature threshold E; and the fourth temperature threshold H may be the same as or different from the second temperature threshold F, which is not limited in the present application. When the temperature of the power tool 100 is less than or equal to the third temperature threshold G, the corresponding preset parameter range is a seventh parameter range, and the corresponding preset conduction angle is a seventh conduction angle. Specifically, the case is similar to the case where the battery pack temperature is less than the first temperature threshold E, and the details are not repeated here. The seventh parameter range may be the same as or different from the fifth parameter range, which is not limited in the present application. When the temperature of the power tool 100 is greater than the third temperature threshold G and less than the fourth temperature threshold H, the corresponding preset parameter range is a variation range, the preset parameter range is inversely proportional to the temperature of the power tool 100, and the preset conduction angle is inversely proportional to the temperature of the power tool 100. Specifically, the change is similar to the change when the battery pack temperature is between the first temperature threshold E and the second temperature threshold F, and the details are not repeated here. When the temperature of the power tool 100 is greater than or equal to the fourth temperature threshold H, the corresponding preset parameter range is 0 or the corresponding preset parameter range is an eighth parameter range. When the preset parameter range is the eighth parameter range, the corresponding conduction angle is an eighth conduction angle. Specifically, the case is similar to the case where the battery pack temperature is greater than or equal to the second temperature threshold F, and the details are not repeated here.

In some examples, similar to the battery pack temperature, the preset parameter threshold of the power tool 100 corresponding to the temperature of the power tool 100 includes only the third temperature threshold G (or the fourth temperature threshold H), and the details are not repeated here.

In the present application, corresponding preset parameter ranges and preset conduction angles are set for different power tool parameters, the power tool parameter and the preset parameter range corresponding to the power tool parameter are acquired through the controller before the electric motor is started, and then after the electric motor is started, the working parameter of the electric motor is controlled to be within the preset parameter range so that the stator windings switch to the conduction manner corresponding to the preset parameter range, and the conduction angle of the power tool is the conduction angle corresponding to the preset parameter range (that is, the preset conduction angle). When the power tool parameter changes, the conduction angle of the electric motor windings can be controlled to be a reasonable conduction angle so that the power tool is not easy to enter the protection, and the power tool is not easy to stop, thereby improving the cutting feel of the power tool.

In some examples, the corresponding conduction angle of the stator windings may be determined according to a combination of the battery pack voltage, the battery pack capacity, the battery pack temperature, and the temperature of the power tool 100. After the switch of the power tool 100 is turned on and before the electric motor 11 is started, the controller 21 may detect the battery pack voltage, the battery pack capacity, the battery pack temperature, and the temperature of the power tool 100. The specific detection method is described above in the present application, and the details are not repeated here. For example, the conduction angle corresponding to the battery pack voltage is set to CB1, and the magnitude of CB1 is proportional to the battery pack voltage, that is, the greater the battery pack voltage, the greater CB1. The conduction angle corresponding to the battery pack capacity is set to CB2, and the magnitude of CB2 is proportional to the battery pack capacity, that is, the greater the battery pack capacity, the greater CB2. The conduction angle corresponding to the battery pack temperature is set to CB3, and CB3 is inversely proportional to the battery pack temperature, that is, the higher the battery pack temperature, the smaller CB3. The conduction angle corresponding to the temperature of the power tool 100 is set to CB4, and the magnitude of CB4 is inversely proportional to the temperature of the power tool 100, that is, the higher the temperature of the power tool 100, the smaller CB4 is. Therefore, after detecting the battery pack voltage, the battery pack capacity, the battery pack temperature, and the temperature of the power tool 100, the controller 21 can determine the corresponding conduction angles, respectively.

To determine the corresponding conduction angle of the stator windings using a combination of respective conduction angles corresponding to the battery pack voltage, the battery pack capacity, the battery pack temperature, and the temperature of the power tool 100, the weight corresponding to CB1 is set to a first weight V1, the weight corresponding to CB2 is a second weight V2, the weight corresponding to CB3 is a third weight V3, and the weight corresponding to CB4 is a fourth weight V4. The sum of V1, V2, V3, and V4 is 1, and V1, V2, V3, and V4 are determined according to empirical values. Therefore, the conduction angle of the stator windings can be determined by the formula CB1*V1+CB2*V2+CB3*V3+CB4*V4. Therefore, the corresponding conduction angle of the stator windings can be determined according to a combination of the battery pack voltage, the battery pack capacity, the battery pack temperature, and the temperature of the power tool 100.

To increase the rotational speed of the electric motor in the full speed segment of a non-inductive motor, the lead angle and spread angle are generally introduced in the electric motor control to increase the conduction angle of the windings and improve the field weakening of the windings, thereby increasing the rotational speed of the electric motor. That is to say, the three-phase stator windings of the electric motor no longer adopt the simple conduction and commutation in twos, but also adopt the process of conduction and commutation in threes, so as to increase the conduction angle of the electric motor windings.

Figure 17:
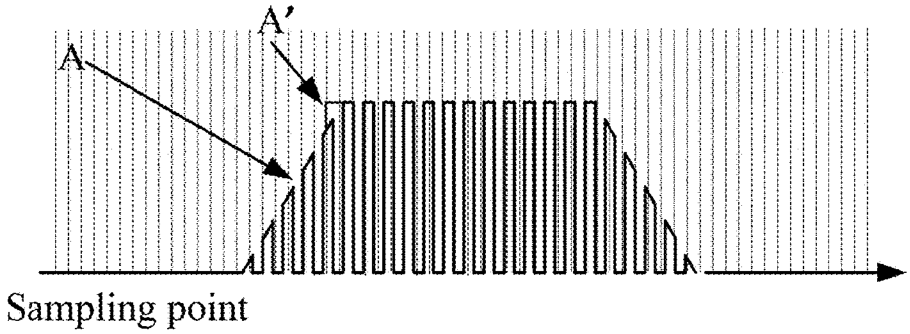
FIG. 17 is a schematic diagram illustrating the cause of inaccurate commutation point detection in the existing art.

When the stator windings of the electric motor are turned on in twos, the floating phase during commutation occupies an electrical angle of 60° in one electrical cycle. Even if the commutation point detection is inaccurate, the next commutation lag does not occur. However, when the winding conduction angle is expanded to more than 120°, especially when the winding conduction angle is greater than 150°, the electrical cycle occupied by the floating phase is only 30°. If the commutation point detection is inaccurate, the next commutation lag occurs, the floating phase may be submerged during the next commutation, and the system failure occurs in severe cases. Common factors that cause inaccurate commutation point detection are shown in FIG. 17. Due to the existence of PWM, the smaller the PWM duty cycle, the smaller the probability of the ideal commutation point being detected, causing the actual commutation point A' to lag much behind the ideal commutation point A.

The conduction angle of 150° is used as an example. A controller 302 in FIG. 18 can control the driver circuit to change the driving state to ensure that the conduction angle of the stator windings of the electric motor is 150°. However, when the tool operates with a heavy load, the operation of the electric motor is generally controlled by using the PWM frequency, and this manner makes it more difficult to detect the commutation moment of the stator windings. As shown in FIG. 19, during the PWM control cycle, the voltage of the floating phase in the dotted box is 0, the controller cannot identify the position information of the rotor of the electric motor, and the controller may use the point where the floating phase voltage appears as the commutation moment point for commutation, bringing a relatively large error and resulting in commutation lag.

To solve the preceding problem, when the stator windings are turned on according to the preset conduction angle, the controller 302 may estimate in advance the ideal commutation moment of the floating phase of the stator windings corresponding to the corresponding conduction angle; and then at the ideal commutation moment, regardless of whether the voltage of the floating phase appears, the driver circuit can be controlled to change the conduction manner, and the stator windings of the electric motor can be controlled to perform the commutation action. The preset conduction angle may be a preset conduction angle of any magnitude, such as any conduction angle of greater than 120° and less than 150° or any conduction angle of greater than 120° and less than 180°.

Figure 18:
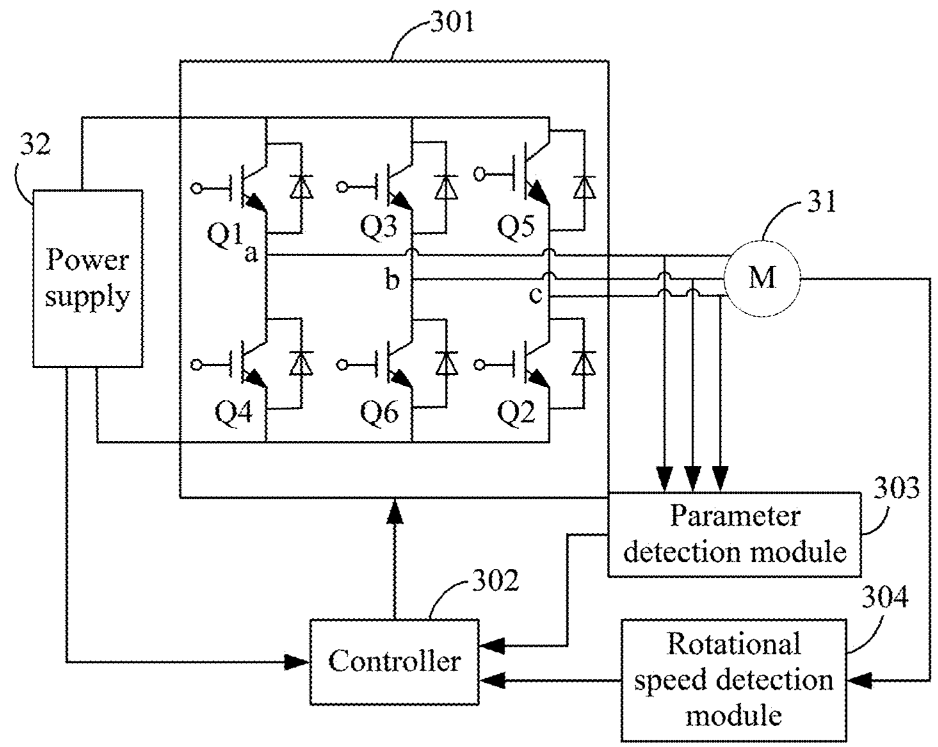
FIG. 18 is a circuit block diagram of a power tool according to an example of the present application.
Figure 19:
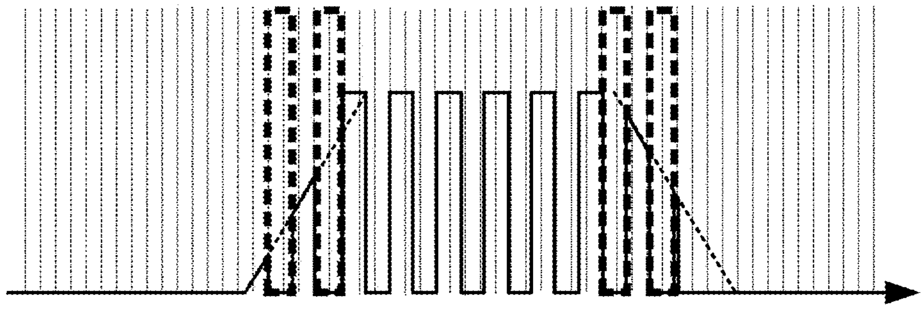
FIG. 19 is a schematic diagram of partial winding commutation of electric motor windings under PWM according to an example of the present application.

In an example, as shown in FIG. 18, a parameter detection module 303 can detect the working parameter of the floating phase during the commutation process of the stator windings of the electric motor, and the controller 302 can estimate the ideal commutation moment according to the acquired working parameter and then control the stator windings to commutate at the ideal commutation moment. The working parameter of the floating phase may be understood as a parameter that changes over time. For example, the working parameter of the floating phase during the commutation process of the stator windings of the electric motor may include the phase voltage or phase current of the floating phase.

Figure 20:
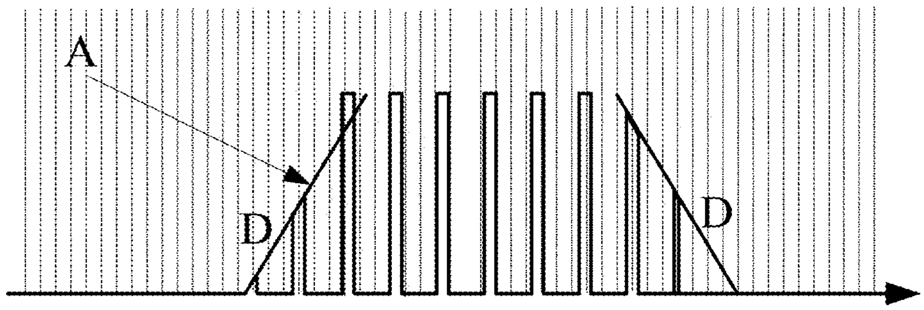
FIG. 20 is a schematic diagram illustrating the phase voltage change trend of the floating phase according to an example of the present application.

In an example, the controller 302 may estimate the rate of change of the phase voltage of the floating phase according to the phase voltages of the floating phase at at least two moments during the commutation process of the stator windings. As shown in FIG. 20, the controller 302 estimates the rate of change of the floating phase voltage according to the floating phase voltages at two moments, and the solid line D expresses the rate of change of the floating phase voltage. On this rate of change line, the ideal commutation moment corresponding to the conduction and commutation of the stator windings according to the preset conduction angle is A. Even if the phase voltage of the floating phase at moment A is 0, the controller 302 can accurately control the commutation of the electric motor. In an optional example, the controller 302 may estimate the rate of change of the current based on the phase current of the floating phase at one or more points and estimate the ideal commutation time A according to the rate of change of the current. It is to be understood that there may be a certain error in the estimated ideal commutation moment, but the error is within an acceptable range. That is to say, the error in the ideal commutation moment leads to a slight deviation in the conduction angle, and the deviation may be controlled within a range of ±5°. It is to be noted that the example of the present application is mainly to solve the problem of inaccurate commutation moment detection when the electric motor adopts conduction and commutation in threes. Therefore, in this example, the conduction angle is greater than 120° and less than 180°. Preferably, the conduction angle is greater than 120° and less than 150°. The conduction angle of 140° is used as an example. During the operation of the electric motor, the controller controls the commutation of the electric motor by estimating the ideal commutation moment and can maintain the conduction angle within a range of 135° to 140°, such as 135°, 136°, 137°, 138°, 139°, or 140°.

In an example, as shown in FIG. 18, a rotational speed detection unit 304 is further included. The rotational speed detection unit 33 can detect the rotational speed of the electric motor. The controller 302 may estimate the ideal commutation moment according to the acquired rotational speed of the electric motor and the phase voltage of the floating phase of the stator windings at any moment.

Since the voltage change of the floating phase during the commutation process of the electric motor has certain regular characteristics, in the example of the present application, the detected parameters related to the floating phase are used to parameterize the preceding characteristics, and according to the parameterized change characteristics of the floating phase voltage, the ideal commutation moment of the stator windings of the electric motor is calculated so that the floating phase being submerged due to commutation lag can be avoided; and under the premise of ensuring that the control system can operate according to the preset conduction angle, the system stability can be ensured.

In an example, the power tool 100 is mainly an impact tool, such as an impact wrench. The impact wrench often needs to perform the impact action at a relatively low speed. For example, the impact wrench impacts very soft wood boards, and a relatively small drill bit is aligned. However, since it is very difficult for the impact wrench to have the relatively low speed and maintain the constant low-speed output, operations such as the impact on the wood board and the alignment of the drill bit are difficult to perform smoothly. Generally, to achieve the impact action at a low speed, the controller 21 in FIG. 3 adjusts the duty cycle of the PWM control signal according to the commutation time of the electric motor windings, thereby controlling the rotational speed of the electric motor. For example, the controller 21 may monitor the commutation time of the electric motor 11, when the commutation time is greater than a set time threshold, increase the duty cycle of the PWM control signal to increase the rotational speed of the electric motor, and when the commutation occurs again, immediately reduce the PWM duty cycle so that the electric motor can keep rotating at a constant low speed. However, there is a problem with the control, that is, the duty cycle increases only when the preset value of the commutation time is exceeded, and the rotational speed cannot be controlled to change in real time. In addition, due to the influence of inertia, if the duty cycle increases too fast, the rotational speed may increase too fast; and if the duty cycle increases too slowly, the actual rotational speed may be less than the target speed. To sum up, the control accuracy of the rotational speed is insufficient.

To solve the preceding problem, before the electric motor commutates again, the controller 21 may adjust the PWM duty cycle according to changes in some parameters so that the electric motor can keep operating at a constant target rotational speed.

Figure 21:
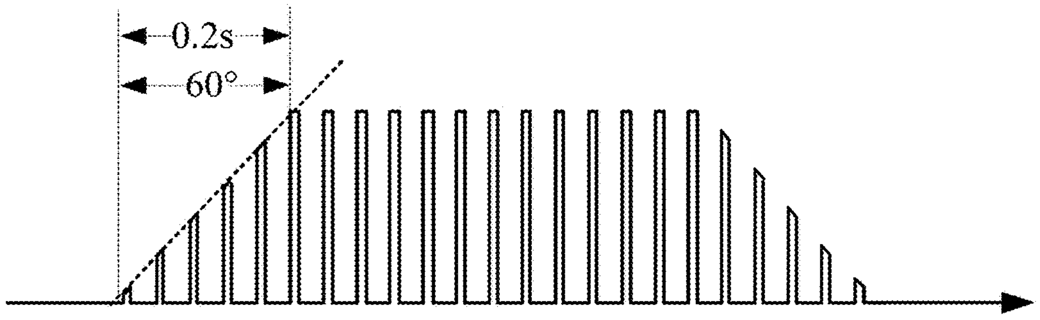
FIG. 21 is a schematic diagram illustrating the phase voltage change trend of the floating phase according to an example of the present application.

As shown in FIG. 21, during the operation of the electric motor, the time for one commutation is 0.2 s, and the floating phase occupies an electrical angle of 60° during the commutation process. PWM always exists during the entire control cycle. During the commutation process of the electric motor, the change of the phase voltage of the floating phase is approximately in a straight line, and the entire change process lasts for one commutation time. That is to say, within one commutation time, if the rotational speed of the electric motor is constant, the phase voltage of the floating phase continues changing stably. If the voltage sampling cycle is fixed, the voltage change or voltage value during each sampling can be estimated. If the voltage change or voltage value is significantly different from a set value, it can be determined that the rotational speed of the electric motor has changed. In an example, if the electric motor operates at a constant speed, the time for the electric motor windings to perform one commutation is fixed and related to the rotational speed of the electric motor. If the electric motor still keeps operating at a constant speed during the commutation time, the rate of change of the floating phase of the stator windings, the duty cycle of the PWM control signal, the sampling cycle of the working parameter of the electric motor, and the like are basically unchanged. At the same time, the relationship between the preceding parameters is also basically unchanged.

In the example of the present application, the duty cycle of the PWM signal may be adjusted according to the preceding parameters so that the electric motor can keep operating at a constant low speed.

In an example, as shown in FIG. 3, the parameter detection module 22 can detect the working parameter of the operating electric motor 11. Moreover, according to the relationship between the acquired working parameter and the preset parameter, the duty cycle of the PWM control signal can be adjusted in real time before the commutation of the electric motor so that the electric motor can keep moving with a load at a relatively low rotational speed. The movement with a load may be the impact work or striking action at a low speed.

In an example, the parameter detection module 22 can detect in real time the phase voltage of the floating phase during the commutation process of the stator windings, the phase current of the floating phase during the commutation process of the stator windings, or the phase voltage or phase current when the stator windings are turned on during the operation of the electric motor 11. The controller 21 may compare one or more of the preceding parameters with the preset parameter threshold and then determine whether to adjust the PWM duty cycle according to a comparison result, so as to control the change of the rotational speed of the electric motor in advance, thereby avoiding the following: the duty cycle is changed only during the commutation of the electric motor, resulting in relatively low control accuracy.

In an example, the controller 21 is configured to determine an intermediate parameter according to the phase voltage of the floating phase during the commutation process of the stator windings of the electric motor and the phase voltage when the stator windings are turned on; and adjust the duty cycle of the PWM control signal according to the relationship between the intermediate parameter and the preset parameter threshold to keep the electric motor operating at the constant target rotational speed. For example, the controller 21 may calculate the ratio of the phase voltage of the floating phase during the commutation process of the stator windings to the phase voltage when the stator windings are turned on; when the ratio is less than or equal to the preset parameter threshold, increase the duty cycle of the PWM control signal to increase the rotational speed of the electric motor 11; and when the ratio is greater than the preset parameter threshold, reduce the duty cycle of the PWM control signal to reduce the rotational speed of the electric motor 11. Whether it is increasing or reducing the duty cycle of the PWM control signal, it is an adjustment towards the goal of keeping the electric motor operating at a constant low speed.

In this example, there is no need to pay attention to whether the stator windings commutate, and the PWM duty cycle is adjusted in real time according to the relationship between the phase voltage of the floating phase and the phase voltage of the conduction phase so that the adjustment timeliness of the rotational speed of the electric motor is ensured.

In an example, the preceding preset parameter threshold may be set according to the sampling cycle of the working parameter of the electric motor and the commutation time of the stator windings. For example, the controller 21 may determine the ratio of the sampling cycle of the working parameter of the electric motor to the commutation time of the stator windings as the preset parameter threshold. Optionally, the controller 21 may set the preset parameter threshold according to the electrical angle or sampling cycle corresponding to the time for one commutation of the electric motor. Correspondingly, if the preset parameter threshold changes, the working parameter of the operating electric motor compared with the preset parameter threshold is adjusted accordingly.

In an example, the controller 21 may compare in real time a first ratio of the phase voltage of the floating phase during the commutation process of the stator windings to the phase voltage when the stator windings are turned on with a second ratio of the sampling cycle of the working parameter of the electric motor to the commutation time of the stator windings; when the first ratio is less than or equal to the second ratio, increase the duty cycle of the PWM control signal to increase the rotational speed of the electric motor 11; and when the first ratio is greater than the second ratio, reduce the duty cycle of the PWM control signal to reduce the rotational speed of the electric motor 11.

In an example, the controller 21 can control the electric motor to keep operating at a constant low speed of 100 RPM to 300 RPM.

In the example of the present application, by analyzing and processing the floating phase voltage and the conduction phase voltage during the commutation process of the electric motor, the PWM duty cycle can be adjusted in advance before the commutation of the electric motor so that the rotational speed of the electric motor is kept constant, thereby ensuring the adjustment real-time and accuracy of the rotational speed of the electric motor under low-speed control.

In the example of the present application, the controller 21 in FIG. 3 may control the conduction states of the switching elements in the driver circuit 20 by modulating the duty cycle of the PWM signal so that the conduction phase of the stator windings can be controlled, and the electrical conduction angle of any magnitude can be obtained. The conduction angles are different, and the working currents, rotational speeds, voltages, or torques of the electric motor are also different.

In an example, the controller 21 may acquire in real time the working parameter outputted by the parameter detection module 22 or acquire the working parameter at a certain frequency. Moreover, when it is detected that the working parameter is greater than a first parameter threshold, the driver circuit 20 is controlled to change the conduction state and change the electrical conduction angle of the stator windings of the operating electric motor. In this example, the adjusted electrical conduction angle of the stator windings is less than 120°. By reducing the electrical conduction angle, the working current of the electric motor can be quickly reduced, thereby avoiding the reduction in the heavy-load performance of the tool caused by frequent triggering of the overcurrent protection mechanism. It is to be understood that the first parameter threshold may be the lowest current value of the power tool 100 that triggers the overcurrent protection mechanism. For example, if the overcurrent protection mechanism is triggered when the working current of the electric motor is 70 A, the first parameter threshold is 70 A.

In an example, when the preceding working parameter is greater than the first parameter threshold, the controller 21 may control the average electrical conduction angle of the stator windings within a period of time to be less than 120°. The period of time may be one or more electrical cycles. For example, the controller 21 may modulate the duty cycle of the PWM signal and change the conduction states of the switching elements in the driver circuit, so as to change the time when the phase windings of the electric motor are on at the first electrical conduction angle within the period of time and the time when the phase windings of the electric motor are on at the second electrical conduction angle within the period of time, thereby obtaining an average electrical conduction angle of less than 120°. The first electrical conduction angle is greater than 120°, and the second electrical conduction angle is less than 120°. For example, the first electrical conduction angle is 150°, and the second electrical conduction angle is 110°. That is to say, to obtain the first electrical conduction angle, the stator windings switch between the pairwise conduction manner and the triplet conduction manner; and to obtain the second electrical conduction angle, the stator windings do not have the triplet conduction manner. For example, if within 100 ms, the time when the phase windings of the electric motor are on at the first electrical conduction angle is 20 ms, and the time when the phase windings of the electric motor are on at the second electrical conduction angle is 80 ms, then the average electrical conduction angle during the period of time is less than 120°. It is to be understood that the conduction time of the first electrical conduction angle may be a continuous time period within a period of time or may be the sum of all non-continuous time periods within a period of time. Optionally, within the period of time, the ratio of the conduction time of the first electrical conduction angle to the conduction time of the second electrical conduction angle is greater than or equal to 0 and less than 1.

Figure 22A:
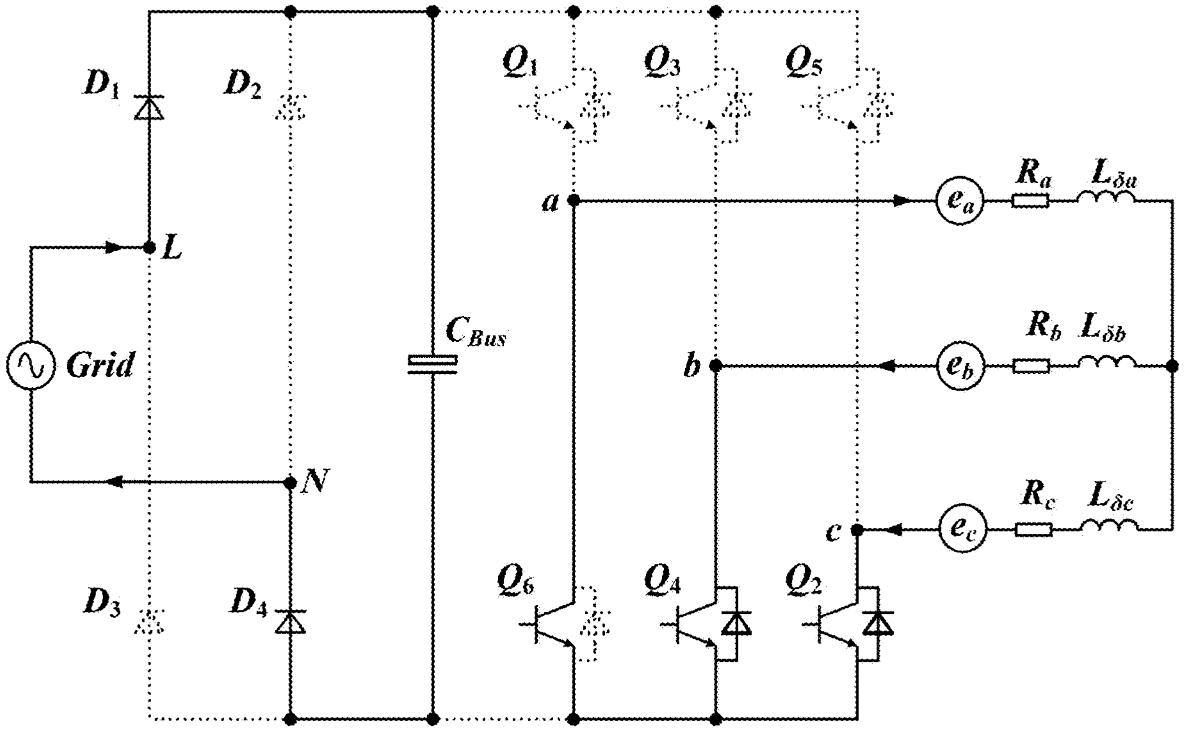
FIG. 22A and FIG. 22B are schematic diagrams illustrating the freewheeling mode of a driver circuit according to an example of the present application.
Figure 22B:
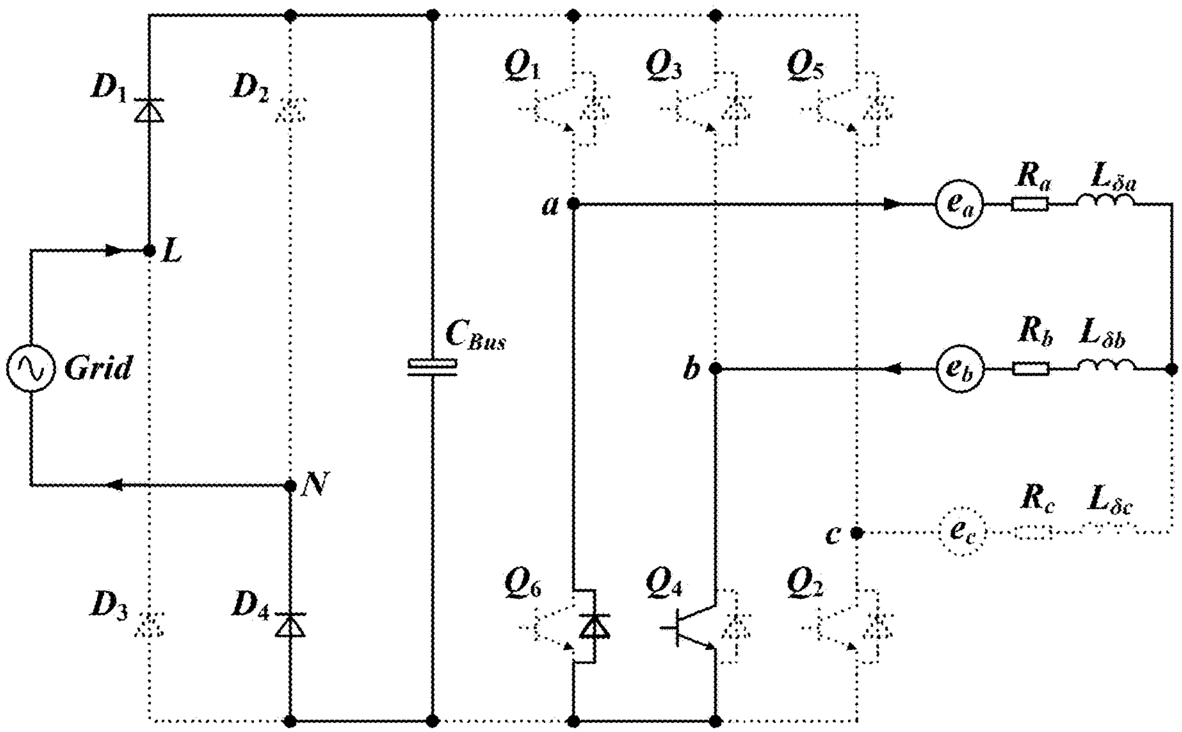
Figure 23:
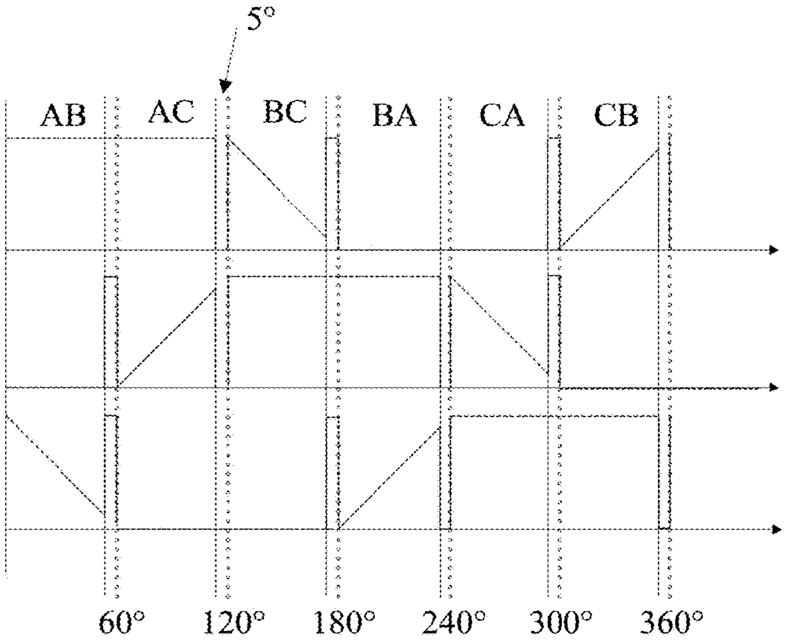
FIG. 23 is a schematic diagram of the periodic commutation when electric motor windings are turned on in twos with an electrical conduction angle of less than 120° according to an example of the present application.

When the preceding time ratio is 0, the stator windings do not have the triplet conduction manner within one electrical cycle. To obtain an electrical conduction angle of less than 120°, the controller 21 may control the driver circuit 20 to change the conduction state so that the stator windings switch between the normal drive mode of the pairwise conduction and the freewheeling mode, thereby obtaining an electrical conduction angle of less than 120°. When the driver circuit is in the freewheeling mode, the driver circuit may be in a freewheeling mode in which three low-side switching elements are turned on as shown in FIG. 22A, or the driver circuit may be in a freewheeling mode in which one switching element is turned on as shown in FIG. 22B. For example, within one electrical cycle, when the drive circuit is turned on in the pairwise conduction driving and the freewheeling mode shown in FIG. 22A, the electrical conduction angle waveforms of the three-phase windings of the electric motor are shown in FIG. 23. In FIG. 23, in every 60° commutation cycle, the three-phase windings have a total low-level time of 5° so that within one electrical cycle, the electrical conduction angle of each phase winding is 110°.

The controller 21 may detect the working parameter of the electric motor in real time during the working process of the power tool 100, and when the working parameter is less than or equal to the first parameter threshold, control the stator windings to be turned on and operating at the first electrical conduction angle. The above working parameter refers to the working current of the electric motor. That is to say, before the working current of the electric motor is greater than the first parameter threshold, the controller 21 controls the electric motor windings to operate at a fixed electrical conduction angle; and when the working parameter of the electric motor is greater than the first parameter threshold, to avoid triggering the overcurrent protection mechanism, the controller 21 reduces the working current of the electric motor by using the preceding manner of reducing the electrical conduction angle to below 120°. Further, after the working current of the electric motor is reduced, the controller 21 may continue monitoring the working current of the electric motor, and when the working current is reduced to less than or equal to a second parameter threshold, control the electric motor windings to be turned on and operating at the first electrical conduction angle.

In an example, during the initial working stage of the electric motor startup, the controller 21 may control the electric motor windings to be turned on and operating at a third electrical conduction angle for a preset period of time and then control the electric motor windings to be turned on and operating at the first electrical conduction angle. When the electric motor windings are turned on and operating at the first electrical conduction angle, the controller 21 may detect the working current of the electric motor. Moreover, when the working current is less than or equal to the first parameter threshold, the duty cycle of the PWM signal is modulated to achieve constant-speed control at the first electrical conduction angle; and when the working current is greater than the first parameter threshold, the electric motor windings are controlled to be turned on and operating at a conduction angle of less than 120° until the working current of the electric motor is less than or equal to the second parameter threshold, and then the electric motor windings are controlled to switch to the conduction and operation at the first electrical conduction angle. The third electrical conduction angle is greater than the second electrical conduction angle and less than the first electrical conduction angle. Optionally, the third electrical conduction angle is 120°.

Figure 24:
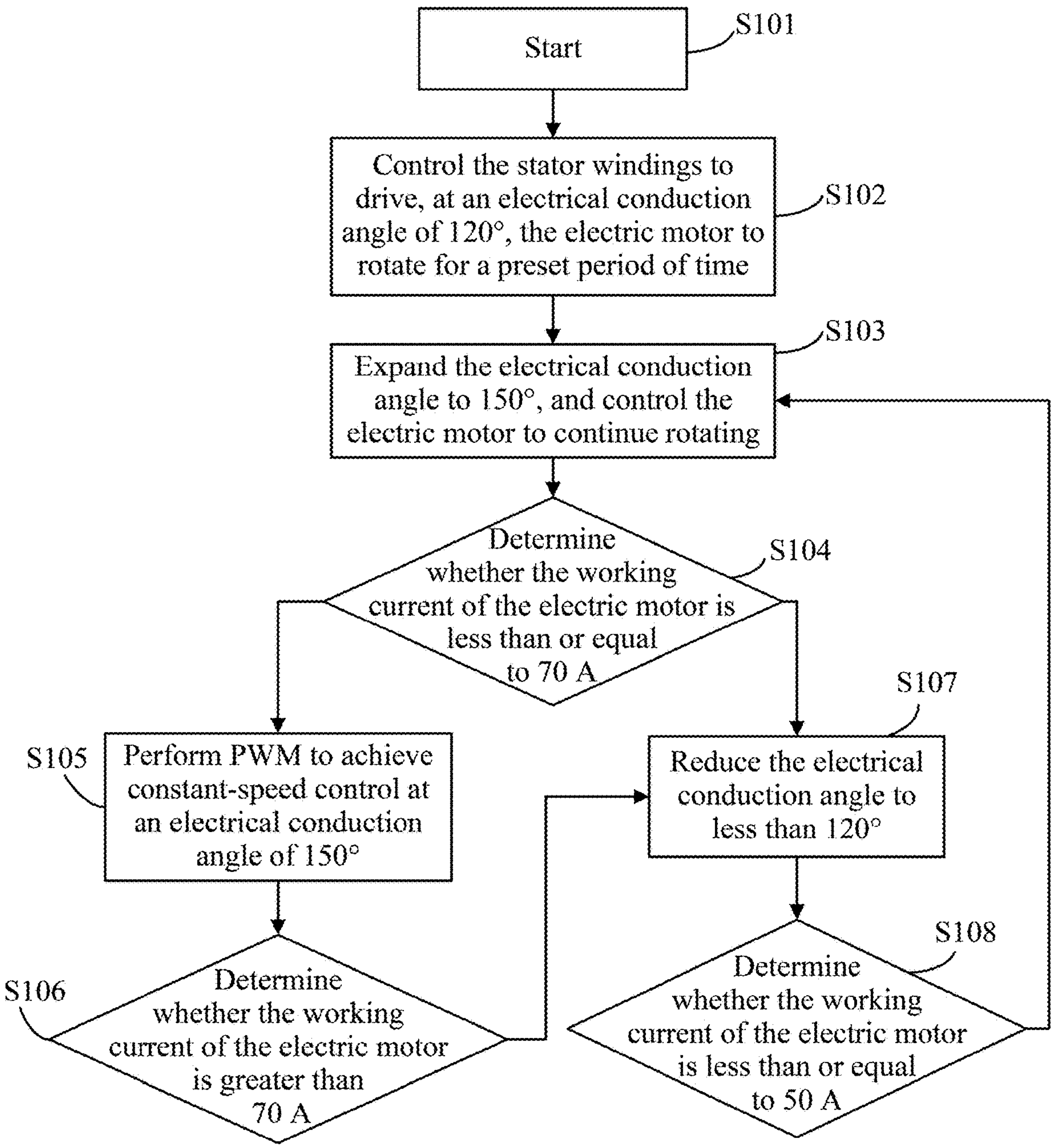
FIG. 24 is a flowchart of a method for controlling a power tool according to an example of the present application.

Referring to FIG. 24, a process of controlling a power tool includes the steps described below.

In S101, startup is performed.

In S102, the stator windings are controlled to drive, at an electrical conduction angle of 120°, the electric motor to rotate for a preset period of time.

The preset period of time may be the time for the rotor of the electric motor to rotate for two turns or the time for two electrical cycles.

In S103, the electrical conduction angle is expanded to 150°, and the electric motor is controlled to continue rotating.

In S104, whether the working current of the electric motor is less than or equal to 70 A is determined; if so, step S105 is performed, otherwise step S107 is performed.

The first parameter threshold is set to 70 A.

In S105, PWM is performed to achieve constant-speed control at an electrical conduction angle of 150°.

In S106, whether the working current of the electric motor is greater than 70 A is determined. If so, step S107 is performed, otherwise step S105 is performed.

In S107, the electrical conduction angle is reduced to less than 120°.

In S108, whether the working current of the electric motor is less than or equal to 50 A is determined. If so, step S103 is performed.

The second parameter threshold is set to 50 A.

It is to be noted that the preceding are only preferred examples of the present application and the technical principles used therein. It is to be understood by those skilled in the art that the present application is not limited to the examples described herein. For those skilled in the art, various apparent modifications, adaptations, and substitutions can be made without departing from the scope of the present application. Therefore, while the present application is described in detail through the preceding examples, the present application is not limited to the preceding examples and may include more other equivalent examples without departing from the concept of the present application. The scope of the present application is determined by the scope of the appended claims.

What is claimed is:

1. A power tool, comprising:

an electric motor comprising a rotor and three-phase stator windings;

a driver circuit having a plurality of semiconductor switching elements;

a parameter detection module for detecting a working parameter of the operating electric motor; and a controller, electrically connected to at least the driver circuit and the electric motor, configured to acquire the working parameter and, according to the working parameter, correct an electrical conduction angle of the stator windings of the operating electric motor, wherein the electrical conduction angle of the stator windings is greater than 120° and less than 180°, and wherein the controller is configured to calculate a ratio of a phase voltage of a floating phase during a commutation process of the stator windings to a phase voltage when the stator windings are turned on and reduce the electrical conduction angle of the stator windings when the ratio is greater than a preset ratio.

2. The power tool of claim 1, wherein the controller is configured to determine an intermediate parameter according to the phase voltage of the floating phase during the commutation process of the stator windings and the phase voltage when the stator windings are turned on and reduce the electrical conduction angle of the stator windings when the intermediate parameter is not within a preset parameter range.

3. The power tool of claim 1, wherein the electrical conduction angle of the stator windings is greater than 120° and less than 150°.

4. The power tool of claim 1, wherein, during a working process of the electric motor, the stator windings have a first conduction manner in which two-phase windings commutate and are turned on and a second conduction manner in which the three-phase windings commutate and are turned on and the controller is configured to control the stator windings to switch from the first conduction manner to the second conduction manner when the working parameter is within a preset parameter range.

5. The power tool of claim 4, wherein the controller is configured to set a conduction time of the second conduction manner according to the working parameter and a rotational speed of the electric motor and control the stator windings to switch to the first conduction manner when the conduction time ends.

6. The power tool of claim 4, wherein the controller is configured to calculate a ratio of the phase voltage of the floating phase during the commutation process of the stator windings to the phase voltage when the stator windings are turned on and, when the ratio is within a preset parameter range, control the stator windings to switch from the first conduction manner to the second conduction manner.

7. The power tool of claim 4, wherein the controller is configured to acquire a power tool parameter, acquire the corresponding preset parameter range and a preset conduction angle according to the power tool parameter and a preset power tool parameter threshold, and control the working parameter to be within the preset parameter range so that the stator windings switch to the preset conduction angle corresponding to the preset parameter range.

8. The power tool of claim 7, wherein the power tool parameter comprises a battery pack voltage, and the preset power tool parameter threshold comprises a first voltage threshold and/or a second voltage threshold.

9. The power tool of claim 7, wherein the power tool parameter comprises a battery pack capacity, and the preset power tool parameter threshold comprises a first capacity threshold and/or a second capacity threshold.

10. The power tool of claim 7, wherein the power tool parameter comprises a battery pack temperature or a power tool temperature, and the preset power tool parameter threshold comprises a first temperature threshold and/or a second temperature threshold and a third temperature threshold and/or a fourth temperature threshold.

11. A power tool, comprising:

an electric motor comprising a rotor and three-phase stator windings, wherein the stator windings have an electrical conduction angle when the electric motor operates;

a driver circuit having a plurality of semiconductor switching elements;

a parameter detection module for detecting a working parameter of the operating electric motor; and a controller, electrically connected to at least the driver circuit and the electric motor, configured to acquire the working parameter and, according to the working parameter, correct the electrical conduction angle of the stator windings of the operating electric motor, wherein the controller is configured to determine an intermediate parameter according to a phase voltage of a floating phase during a commutation process of the stator windings and a phase voltage when the stator windings are turned on and reduce the electrical conduction angle of the stator windings when the intermediate parameter is not within a preset parameter range.

12. A power tool, comprising:

a power supply for supplying electrical energy;

an electric motor comprising a rotor and three-phase stator windings;

a driver circuit having a plurality of semiconductor switching elements for switching a conduction number of the stator windings of the electric motor;

a parameter detection module for detecting a working parameter of the operating electric motor; and a controller electrically connected to at least the driver circuit and the electric motor;

wherein, during a working process of the electric motor, the stator windings have a first conduction manner in which two-phase windings commutate and are turned on and a second conduction manner in which the three-phase windings commutate and are turned on and the controller is configured to acquire the working parameter and, when the working parameter is within a preset parameter range, control the stator windings to switch from the first conduction manner to the second conduction manner, wherein the controller is configured to acquire a power tool parameter, acquire a corresponding preset parameter range and a preset conduction angle according to the power tool parameter and a preset power tool parameter threshold, and control the working parameter to be within the preset parameter range so that the stator windings switch to a preset conduction angle corresponding to the preset parameter range, wherein the power tool parameter comprises a battery pack voltage, a battery pack capacity, a battery pack temperature, or a power tool temperature.

13. The power tool of claim 12, wherein the controller is configured to set a conduction time of the second conduction manner according to the working parameter and a rotational speed of the electric motor and when the conduction time ends, control the stator windings to switch to the first conduction manner.

14. The power tool of claim 12, wherein the working parameter comprises a phase voltage of a floating phase during a commutation process of the stator windings and a phase voltage of a conduction phase of the stator windings.

15. The power tool of claim 14, wherein the controller is configured to calculate a ratio of the phase voltage of the floating phase during the commutation process of the stator windings to the phase voltage when the stator windings are turned on and, when the ratio is within the preset parameter range, control the stator windings to switch from the first conduction manner to the second conduction manner.

16. The power tool of claim 14, wherein the working parameter further comprises the demagnetization time during the commutation process of the stator windings and the bus voltage of the electric motor; and the controller is configured to set the preset parameter range according to the demagnetization time or the bus voltage.

* * * * *